(12) United States Patent
Grasmann et al.

(10) Patent No.: US 10,920,078 B2
(45) Date of Patent: Feb. 16, 2021

(54) SILICONE-POLYETHER COPOLYMER, SEALANTS COMPRISING SAME, AND RELATED METHODS

(71) Applicants: DOW SILICONES CORPORATION, Midland, MI (US); DOW GLOBAL TECHNOLOGIES LLC, Midland, MI (US)

(72) Inventors: Martin Grasmann, Midland, MI (US); David Hagan, Midland, MI (US); Brian Harkness, Midland, MI (US); William H. Heath, Lake Jackson, TX (US); Stephen Michael Hlinka, II, Midland, MI (US); Eric Joffre, Midland, MI (US); William Johnson, Midland, MI (US); Jeanette Young, Midland, MI (US); Bizhong Zhu, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 9 days.

(21) Appl. No.: 16/626,387

(22) PCT Filed: Jun. 26, 2018

(86) PCT No.: PCT/US2018/039499
§ 371 (c)(1),
(2) Date: Dec. 24, 2019

(87) PCT Pub. No.: WO2019/005794
PCT Pub. Date: Jan. 3, 2019

(65) Prior Publication Data
US 2020/0157278 A1 May 21, 2020

Related U.S. Application Data

(60) Provisional application No. 62/524,636, filed on Jun. 26, 2017, provisional application No. 62/524,637, filed on Jun. 26, 2017, provisional application No. 62/524,639, filed on Jun. 26, 2017.

(51) Int. Cl.
| | | |
|---|---|---|
| *C08L 83/12* | (2006.01) | |
| *C08G 65/336* | (2006.01) | |
| *C08G 77/46* | (2006.01) | |
| *C08G 65/34* | (2006.01) | |
| *C08G 77/18* | (2006.01) | |
| *C08K 5/00* | (2006.01) | |
| *C08K 5/5415* | (2006.01) | |
| *C09D 183/12* | (2006.01) | |
| *B01J 31/12* | (2006.01) | |

(52) U.S. Cl.
CPC ............ *C08L 83/12* (2013.01); *C08G 65/336* (2013.01); *C08G 65/34* (2013.01); *C08G 77/18* (2013.01); *C08G 77/46* (2013.01); *C08K 5/0025* (2013.01); *C08K 5/5415* (2013.01); *C09D 183/12* (2013.01); *B01J 31/124* (2013.01); *C08G 2190/00* (2013.01); *C08K 5/0016* (2013.01)

(58) Field of Classification Search
CPC .............................. C08G 77/18; C08G 77/46
See application file for complete search history.

(56) References Cited

U.S. PATENT DOCUMENTS

| | | |
|---|---|---|
| 3,398,174 A | 8/1968 | Barnes, Jr. |
| 3,971,751 A | 7/1976 | Isayama et al. |
| 3,972,751 A | 8/1976 | Engelhard |
| 4,207,071 A | 6/1980 | Lipowitz et al. |
| 4,283,519 A | 8/1981 | Pines et al. |
| 4,323,488 A | 4/1982 | Takago et al. |
| 4,345,053 A | 8/1982 | Rizk et al. |
| 4,625,012 A | 11/1986 | Rizk et al. |
| 4,772,675 A | 9/1988 | Klosowski et al. |
| 4,960,844 A | 10/1990 | Singh |

(Continued)

FOREIGN PATENT DOCUMENTS

| | | |
|---|---|---|
| EP | 265929 A2 | 5/1988 |
| EP | 415404 A2 | 3/1991 |

(Continued)

OTHER PUBLICATIONS

International Search Report for PCT/US2018/039499 dated Sep. 26, 2018, 4 pages.
Machine assisted English translation of JPH11255883A obtained from https://patents.google.com/patent on Apr. 9, 2020, 13 pages.
Machine assisted English translation of JPH11279274A obtained from https://patents.google.com/patent on Apr. 9, 2020, 32 pages.
Machine assisted English translation of JP2007091930A obtained from https://patents.google.com/patent on Apr. 9, 2020, 21 pages.

*Primary Examiner* — Marc S Zimmer
(74) *Attorney, Agent, or Firm* — Warner Norcross + Judd LLP

(57) ABSTRACT

A silicone-polyether copolymer has the formula $X_g[Z_jY_o]_c$, where each X is an independently selected silicone moiety having a particular structure, each Y is an independently selected polyether moiety, each Z is an independently selected siloxane moiety, subscript c is from 1 to 150, subscript g is >1, and each subscript j and o are independently >0 and <2, with the proviso that j+o=2 in each moiety indicated by subscript c. A method of preparing the silicone-polyether copolymer is also disclosed, and comprises reacting a polyether compound, a chain extending organosilicon compound, and an endcapping organosilicon compound in the presence of a hydrosilylation catalyst. A sealant is also disclosed, the sealant comprising the silicone-polyether copolymer and a condensation-reaction catalyst.

19 Claims, No Drawings

(56) References Cited

U.S. PATENT DOCUMENTS

| | | |
|---|---|---|
| 5,109,064 A | 4/1992 | Wakabayashi et al. |
| 5,130,413 A | 7/1992 | Asai et al. |
| 5,403,881 A | 4/1995 | Okawa et al. |
| 5,623,044 A | 4/1997 | Chiao |
| 5,811,566 A | 9/1998 | Watabe et al. |
| 5,840,800 A | 11/1998 | Joffre et al. |
| 5,852,137 A | 12/1998 | Hsieh et al. |
| 6,132,664 A | 10/2000 | Freiberg et al. |
| 6,133,370 A | 10/2000 | Gutek et al. |
| 6,258,878 B1 | 7/2001 | Bahadur et al. |
| 6,265,518 B1 | 7/2001 | Krahnke et al. |
| 6,395,341 B1 | 5/2002 | Arakawa et al. |
| 6,437,071 B1 | 8/2002 | Odaka et al. |
| 6,503,995 B2 | 1/2003 | Tsuji et al. |
| 6,541,593 B1 | 4/2003 | Jyono et al. |
| 7,223,817 B2 | 5/2007 | Nakagawa et al. |
| 7,279,589 B2 | 10/2007 | Uehara et al. |
| 7,345,130 B2 | 3/2008 | Zhu et al. |
| 7,601,428 B2 | 10/2009 | Yamane et al. |
| 7,625,990 B2 | 12/2009 | Wakabayashi et al. |
| 7,763,699 B2 | 7/2010 | Odaka et al. |
| 7,829,649 B2 | 11/2010 | Yamane et al. |
| 7,893,170 B2 | 2/2011 | Wakioka et al. |
| 7,960,459 B2 | 6/2011 | Noro et al. |
| 7,973,108 B2 | 7/2011 | Okamoto et al. |
| 7,994,262 B2 | 8/2011 | Kono |
| 8,030,427 B2 | 10/2011 | Wakabayashi et al. |
| 8,450,514 B2 | 5/2013 | Schubert et al. |
| 8,481,640 B2 | 7/2013 | Gough et al. |
| 8,592,545 B2 | 11/2013 | Mackinnon et al. |
| 8,822,626 B2 | 9/2014 | Vyakaranam et al. |
| 8,877,885 B2 | 11/2014 | Vyakaranam et al. |
| 9,428,617 B2 | 8/2016 | Mittal et al. |
| 9,617,390 B2 | 4/2017 | Hinzmann et al. |
| 2002/0010245 A1 | 1/2002 | Enami et al. |
| 2002/0013427 A1 | 1/2002 | Tsuji et al. |
| 2002/0084030 A1 | 7/2002 | Kotani et al. |
| 2003/0027974 A1 | 2/2003 | Tamai et al. |
| 2004/0138398 A1 | 7/2004 | Fujimoto et al. |
| 2005/0222332 A1 | 10/2005 | Nakagawa et al. |
| 2006/0293480 A1 | 12/2006 | Landon et al. |
| 2007/0037997 A1 | 2/2007 | Uehara et al. |
| 2007/0093628 A1 | 4/2007 | Zhu et al. |
| 2007/0116907 A1 | 5/2007 | Landon et al. |
| 2007/0173620 A1 | 7/2007 | Kono |
| 2007/0219299 A1 | 9/2007 | Okamoto et al. |
| 2007/0290202 A1 | 12/2007 | Matsumoto et al. |
| 2008/0051547 A1 | 2/2008 | Wakabayashi et al. |
| 2009/0182091 A1 | 7/2009 | Noro et al. |
| 2010/0041910 A1 | 2/2010 | Schubert et al. |
| 2010/0168309 A1 | 7/2010 | Mackinnon et al. |
| 2010/0216925 A1 | 8/2010 | Yano |
| 2010/0234518 A1 | 9/2010 | Ferritto et al. |
| 2012/0135241 A1 | 5/2012 | Yasuda et al. |
| 2013/0060000 A1 | 3/2013 | Zhang et al. |
| 2013/0096252 A1 | 4/2013 | Vyakaranam et al. |
| 2013/0096274 A1 | 4/2013 | Vyakaranam et al. |
| 2014/0010853 A1 | 1/2014 | Williams et al. |
| 2014/0018485 A1 | 1/2014 | Cook et al. |
| 2014/0024774 A1* | 1/2014 | Cook .................... C08G 77/18 524/862 |
| 2014/0127140 A1 | 5/2014 | Ferritto et al. |
| 2014/0302318 A1 | 10/2014 | Ferritto et al. |
| 2015/0087773 A1 | 3/2015 | Williams et al. |
| 2015/0353741 A1 | 12/2015 | Liao |
| 2016/0122478 A1 | 5/2016 | Ferritto et al. |
| 2017/0130096 A1 | 5/2017 | Grunlan et al. |
| 2017/0313816 A1 | 11/2017 | Müller et al. |
| 2017/0369648 A1 | 12/2017 | Willumstad et al. |

FOREIGN PATENT DOCUMENTS

| | | |
|---|---|---|
| EP | 693513 A2 | 1/1996 |
| EP | 1153942 A1 | 11/2001 |
| EP | 1746133 A1 | 1/2007 |
| JP | H11255883 A | 9/1999 |
| JP | H11279274 A | 10/1999 |
| JP | 2001049113 A | 2/2001 |
| JP | 2002356613 A | 12/2002 |
| JP | 2007091930 A | 4/2007 |
| WO | 2007050538 A2 | 5/2007 |
| WO | 2007061642 A2 | 5/2007 |
| WO | 2007075927 A1 | 7/2007 |
| WO | 2014126599 A1 | 8/2014 |

* cited by examiner

SILICONE-POLYETHER COPOLYMER, SEALANTS COMPRISING SAME, AND RELATED METHODS

CROSS-REFERENCE TO RELATED APPLICATIONS

This application is the National Stage of International Appl. No. PCT/US2018/039499 filed on 26 Jun. 2018, which claims priority to and all advantages of U.S. Provisional Application Nos. 62/524,637, 62/524,636, and 62/524,639, filed on 26 Jun. 2017, the contents of which are incorporated herein by reference.

FIELD OF THE INVENTION

The present invention generally relates to copolymers and, more specifically, to a silicone-polyether copolymer, methods of preparing the same, and sealants comprising the same.

DESCRIPTION OF THE RELATED ART

Sealants are known in the art and are utilized in myriad end use applications and environments. Physical and performance properties of sealants, as well as the particular curing mechanism associated therewith, are generally selected based on the particular end use application and environment in which the sealants are utilized. Sealants can be based on a variety of different chemistries and cure mechanisms. For example, sealants can be silicone-based and include organopolysiloxanes. Alternatively, sealants can be organic and include organic components, e.g. to form urethanes. Increasingly, hybrid materials are utilized in sealants, which can combine the benefits traditionally associated with silicone-based sealants and organic sealants.

For example, silane modified polyethers are increasingly utilized in sealants as hybrid materials. However, existing silane modified polyethers have limitations. For example, sealants including conventional silane modified polyethers have undesirable cure speeds. In addition, such sealants may suffer from lesser heat stability than those not including hybrid materials and may undergo unintended side reactions prior to or during curing.

BRIEF SUMMARY OF THE INVENTION

A silicone-polyether copolymer having the formula $X_g[Z_jY_o]_c$ is disclosed. Each X is independently a silicone moiety having one of formulas (I) or (II):

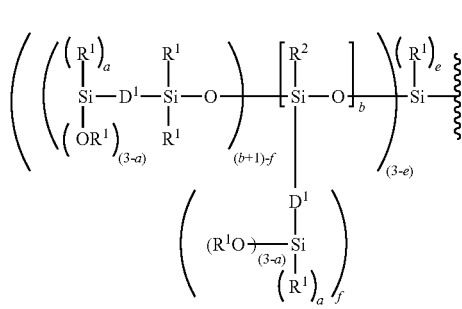

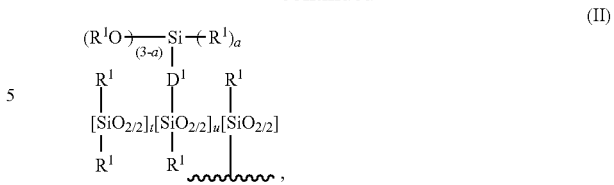

each Y is an independently selected polyether moiety, and each Z is an independently selected siloxane moiety having the formula $[R^1{}_h SiO_{(4-h)/2}]d$. In these moieties, each $R^1$ is an independently selected substituted or unsubstituted hydrocarbyl group having from 1 to 18 carbon atoms; each $R^2$ is an independently selected substituted or unsubstituted hydrocarbyl group having from 1 to 18 carbon atoms; each $D^1$ is an independently selected divalent hydrocarbon group having from 2 to 18 carbon atoms; each subscript a is independently 0 or 1; each subscript b is independently 0 or 1; subscript c is from 1 to 150; each subscript d is from 1 to 1000; each subscript e is independently 1 or 2; each subscript f is independently 0 or 1, with the proviso that within each X, when f is 1, b is 1; subscript g is >1; subscript h is independently selected from 0 to 2 in each moiety indicated by subscript d; each subscript j is independently >0 and <2; each subscript o is independently >0 and <2, with the proviso that j+o=2 in each moiety indicated by subscript c; subscript t is ≥0; and subscript u is >0.

A method of preparing the silicone-polyether copolymer is disclosed. The method comprises reacting a polyether compound having on average more than one terminal unsaturated group, a chain extending organosilicon compound, and an endcapping organosilicon compound in the presence of a hydrosilylation catalyst to give the silicone-polyether copolymer.

A sealant is also disclosed. The sealant comprises a condensation reaction catalyst and further comprises the silicone-polyether copolymer.

A cured product is additionally disclosed. The cured product is formed from the sealant. Further, a composite article and a method of preparing the composite article are disclosed. The composite article comprises a substrate and the cured product disposed on the substrate. The method comprising disposing the sealant on the substrate, and curing the sealant to give the cured product on the substrate, thereby preparing the composite article.

DETAILED DESCRIPTION OF THE INVENTION

A silicone-polyether copolymer has the formula $X_g[Z_jY_o]_c$, wherein each X is independently a silicone moiety having one of formulas (I) or (II):

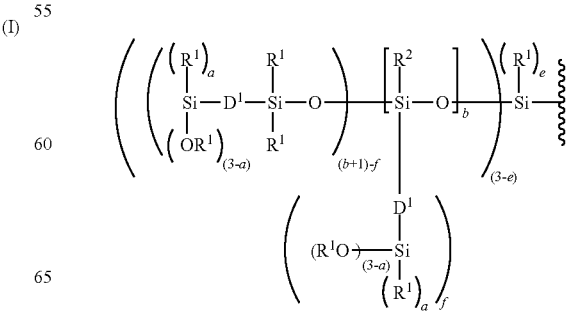

-continued

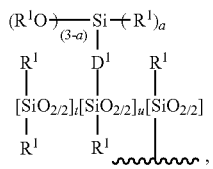
(II)

each Y is an independently selected polyether moiety, and each Z is an independently selected siloxane moiety having the formula $[R^1{}_h SiO_{(4-h)/2}]_d$; where each $R^1$ is an independently selected substituted or unsubstituted hydrocarbyl group having from 1 to 18 carbon atoms; each $R^2$ is an independently selected substituted or unsubstituted hydrocarbyl group having from 1 to 18 carbon atoms; each $D^1$ is an independently selected divalent hydrocarbon group having from 2 to 18 carbon atoms; each subscript a is independently 0 or 1; each subscript b is independently 0 or 1; subscript c is from 1 to 150; each subscript d is from 1 to 1000; each subscript e is independently 1 or 2; each subscript f is independently 0 or 1, with the proviso that within each X, when f is 1, b is 1; subscript h is independently selected from 0 to 2 in each moiety indicated by subscript d; each subscript j is independently >0 and <2; each subscript o is independently >0 and <2, with the proviso that j+o=2 in each moiety indicated by subscript c; subscript t is ≥0; and subscript u is >0.

Each $R^1$ and each $R^2$ is independently selected and may be linear, branched, cyclic, or combinations thereof. Cyclic hydrocarbyl groups encompass aryl groups as well as saturated or non-conjugated cyclic groups. Cyclic hydrocarbyl groups may be monocyclic or polycyclic. Linear and branched hydrocarbyl groups may independently be saturated or unsaturated. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of $R^1$ and/or $R^2$ may be replaced with an atom other than carbon, i.e., $R^1$ and/or $R^2$ may include one or more heteroatoms within the chain, such as oxygen, sulfur, nitrogen, etc. Suitable alkyl groups are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups are exemplified by, but not limited to, phenyl, tolyl, xylyl, naphthyl, benzyl, and dimethyl phenyl. Suitable alkenyl groups include vinyl, allyl, propenyl, isopropenyl, butenyl, isobutenyl, pentenyl, heptenyl, hexenyl, and cyclohexenyl groups. Suitable monovalent halogenated hydrocarbon groups include, but are not limited to, a halogenated alkyl group of 1 to 6 carbon atoms, or a halogenated aryl group of 6 to 10 carbon atoms. Suitable halogenated alkyl groups are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups are exemplified by, but not limited to, the aryl groups described above where one or more hydrogen atoms is replaced with a halogen atom, such as F or Cl. For example, chlorobenzyl and fluorobenzyl are suitable halogenated aryl groups.

In certain embodiments, each of $R^1$ and $R^2$ is an independently selected alkyl group. In specific embodiments, $R^1$ and $R^2$ are different from one another. For example, in these embodiments, $R^2$ may include more carbon atoms than $R^1$. In specific embodiments, each $R^1$ is methyl and each $R^2$ is propyl.

With regard to the silicone-polyether copolymer, it is to be understood that the subformula $[Z_j Y_o]_c$ is not intended to imply a linear structure of the copolymer moieties indicated by ZY. Rather, as understood in the art, the copolymer ZY may be linear or branched, with each moiety indicated by subscript c being independently selected. As such, the silicone-polyether copolymer comprises c number of copolymer moieties ZY, which each comprise o number of polyether moieties Y and j number of siloxane moieties Z. Additionally, as will be understood in view of the description below, each polyether moiety Y and siloxane moiety Z are independently selected, both within each moiety indicated by subscript c and between such moieties, and also may each be linear or branched.

Each subscript c is from 1 to 150, such as from 1 to 100, alternatively from 1 to 50, alternatively from 1 to 25, alternatively from 1 to 10, and alternatively from 1 to 5. Subscript g is greater than 1, such as from 1.1 to 10, alternatively from 1.1 to 8, alternatively from 1.1 to 6, alternatively from 1.1 to 4, alternatively from 1.1 to 3, alternatively from 1.1 to 2, alternatively from 1.1 to 1.9, alternatively from 1.2 to 1.8, alternatively from 1.2 to 1.7, alternatively from 1.3 to 1.7, alternatively from 1.4 to 1.7, alternatively of about 1.4, 1.5, 1.6, or 1.7. Each subscript j is >0 and <2, and each subscript o is >0 and <2, with the proviso that j+o=2 in each moiety indicated by subscript c. As such, subscripts j and o may be considered mole fractions, e.g. where j=1 and o=1 equating to a 0.5:0.5 molar ratio of siloxane moiety Z to polyether moiety Y in a moiety indicated by subscript c. Of course, the molar ratio of Z to Y in each moiety indicated by subscript c is only limited by the requirement that both siloxane moiety Z and polyether moiety Y are present in each moiety indicated by subscript c. For example, the molar ratio of Z:Y may be independently from about 1000:1 to about 1:1000, alternatively from about 100:1 to about 1:100, alternatively from about 10:1 to about 1:10, alternatively from about 5:1 to about 1:5, alternatively from about 2:1 to about 1:2, in each moiety indicated by subscript c. As described above, the subformula $[Z_j Y_o]_c$ is not intended to imply a linear structure of the copolymer moieties indicated by ZY. Likewise, the subformula does not require a particular structure of any of the copolymer moieties ZY. Rather, depending on the values selected for subscripts j and o, the copolymer moiety indicated by subformula $[Z_j Y_o]_c$ may comprise siloxane moieties Z and polyether moieties Y in block form (e.g. Z-Y, Y-Z, Y-Z-Y, Z-Y-Z-Y, YY-ZZ, etc.) or random form. In particular embodiments, the silicone-polyether copolymer comprises polyether moieties Y and siloxane moieties Z in a 2:1 ratio. In some such embodiments, the polyether moieties Y and siloxane moieties Z are present in the silicone-polyether copolymer in block form, such that the silicone-polyether copolymer has the formula $X_g Y[ZY]_c$, where subscripts c and g are defined above. In some of these embodiments, the silicone-polyether copolymer comprises linear polyether moieties Y and linear siloxane moieties Z, and is endcapped by silicone moieties X, such that the silicone-polyether copolymer has the formula $X_{g'}Y[ZY]_cX_{g''}$, where c is defined above, and each of g' and g" is ≥0, with the proviso that g'+g" is >1.

With regard to each X generally, each subscript a is independently 0 or 1. Typically, subscript a is 0. In some embodiments, each subscript a is 0. In certain embodiments, the silicone-polyether copolymer comprises at least one X where subscript a is 1.

With regard to each X of formula (I), each subscript b is independently 0 or 1. In some embodiments, each subscript b is 0. In other embodiments, each subscript b is 1. In further embodiments, the silicone-polyether copolymer comprises at least one X of formula (I) where subscript b is 0 and at least one X of formula (I) where subscript b is 1. Each subscript e is independently 1 or 2. In some embodiments, each subscript e is 1. In other embodiments, each subscript e is 2. In further embodiments, the silicone-polyether copolymer comprises at least one X of formula (I) where subscript e is 1 and at least one X of formula (I) where subscript e is 2. Each subscript f is independently 0 or 1, with the proviso that within each X, when f is 1, b is 1. In some embodiments, each subscript f is 0. In other embodiments, each subscript f is 1, and thus each b is 1. In further embodiments, the silicone-polyether copolymer comprises at least one X of formula (I) where subscript f is 0 and at least one X of formula (I) where subscript f is 1 and b is 1.

With regard to each X of formula (II), subscript t is ≥0. In certain embodiments, subscript t is from 1 to 100, such as from 0 to 80, alternatively from 0 to 60, alternatively from 0 to 30, alternatively from 0 to 10, alternatively from 0 to 5. Subscript u is >0. In particular embodiments, subscript u is from 1 to 20, such as from 1 to 15, alternatively from 1 to 10, alternatively from 1 to 7, alternatively from 1 to 5, and alternatively from 1 to 3.

Each $D^1$ is an independently selected divalent hydrocarbon group having from 2 to 18 carbon atoms, alternatively from 2 to 16 carbon atoms, alternatively from 2 to 14 carbon atoms, alternatively from 2 to 12 carbon atoms, alternatively from 2 to 10 carbon atoms, alternatively from 2 to 8 carbon atoms, alternatively from 2 to 6 carbon atoms, alternatively from 2 to 4 carbon atoms, alternatively 2 or 3 carbon atoms, alternatively 2 carbon atoms. Each $D^1$ may independently be linear or branched. For example, when $D^1$ has two carbon atoms, $D^1$ has formula $C_2H_4$, and may be linear ($CH_2CH_2$) or branched ($CHCH_3$). In certain embodiments, $D^1$ is linear. When the silicone-polyether copolymer is prepared in bulk, in certain embodiments, at least 90 mol % of $D^1$ are linear. In specific embodiments, each $D^1$ is $C_2H_4$.

Each Y is a polyether moiety. Each Y is independently selected, and may be any polyether moiety including at least one, alternatively at least two, ether moieties. Each Y may be the same as any or each other Y. Alternatively, the silicone-polyether copolymer may comprise at least two Y that are different from each other. Y can be linear or branched. Y may be divalent, trivalent, tetravalent, or have a valency greater than 4. Valency, in the context of the polyether moiety Y, refers to the number of Y-X bonds present in the silicone-polyether copolymer. In certain embodiments, the polyether moiety Y is divalent such that the silicone-polyether copolymer has the formula X—Y—X. In other embodiments, the valency of the polyether moiety may be greater than 2, in which case the polyether moiety Y is typically branched.

Each Y typically comprises a polyether having the general formula $-O-(C_nH_{2n}O)_w-$, wherein subscript n is independently selected from 2 to 4 in each moiety indicated by subscript w; and wherein subscript w is from 1 to 1000. In certain embodiments, Y comprises multiple polyethers of such a general formula, which may be present in a linear or branched form with other polyethers to form a polyether moiety Y comprising multiple oxyalkylene-based polyethers. In such embodiments, Y may comprise oxyethylene units ($C_2H_4O$), oxypropylene units ($C_3H_6O$), oxybutylene or oxytetramethylene units ($C_4H_8O$), or mixtures thereof, which may be in block form or randomized in Y. The oxyalkylene units in Y may independently be linear or branched. For example, oxyethylene units, if present, may be of formula $-CH_2CH_2O-$ or of formula $-CHCH_3O-$. Similarly, oxypropylene units may be of formula $-CH_2CH_2CH_2O-$, $-CH_2CHCH_3O-$, or $-CHCH_3CH_2O-$.

For example, Y may comprise a polyether having the general formula $-O-(C_2H_4O)_x(C_3H_6O)_y(C_4H_8O)_z-$, wherein subscript x is from 0 to 999; subscript y is from 1 to 1000; and subscript z is from 0 to 999; and wherein units indicated by subscripts x, y and z may be in randomized or block form in Y. In certain embodiments, x and z are each 0 such that the polyether of Y has the general formula $-O-(C_3H_6O)_y-$, where y is defined above.

In some embodiments, Y has the formula $-D^2-O-(C_nH_{2n}O)_w-D^2-$. In such embodiments, each $D^2$ is an independently selected divalent hydrocarbon group having from 1 to 6 carbon atoms, alternatively from 1 to 5 carbon atoms, alternatively from 1 to 4 carbon atoms, alternatively 1 or 2 carbon atoms. Each $D^2$ may independently be linear or branched. For example, when $D^2$ has two carbon atoms, $D^2$ has formula $C_2H_4$, and may be linear ($CH_2CH_2$) or branched ($CHCH_3$). In certain embodiments, $D^2$ is linear. Any $D^2$ may be the same as or different from any particular $D^1$. In specific embodiments, each $D^2$ is $CH_2$. Each subscript n is independently selected from 2 to 4 in each moiety indicated by subscript w, and subscript w is defined above.

For example, in such embodiments, Y may have the formula $-D^2-O-(C_2H_4O)_x(C_3H_6O)_y(C_4H_8O)_z-D^2-$, wherein subscript x is from 0 to 999; subscript y is from 1 to 1000; and subscript z is from 0 to 999; and wherein units indicated by subscripts x, y and z may be in randomized or block form in Y. In certain embodiments, x and z are each 0 such that Y has the formula $-D^2-O-(C_3H_6O)_y-D^2-$, where $D^2$ and y are defined above. In specific embodiments, each $D^2$ is also $C_3H_6$. When x and z are each 0 and each $D^2$ is $C_3H_6$, Y has the formula $-C_3H_6-O-(C_3H_6O)_y-C_3H_6-$, where y is defined above.

In certain embodiments, Y has the general formula:

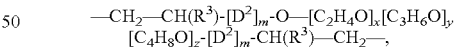

$-CH_2-CH(R^3)-[D^2]_m-O-[C_2H_4O]_x[C_3H_6O]_y[C_4H_8O]_z-[D^2]_m-CH(R^3)-CH_2-$, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, subscript m is 0 or 1, subscript x is from 0 to 999, subscript y is from 1 to 1000, and subscript z is from 0 to 999, and wherein units indicated by subscripts x, y and z may be in randomized or block form in the polyether moiety Y.

Each $R^3$ is independently selected, and may any of the $C_1$-$C_6$, hydrocarbyl groups described herein. As such, any $R^3$ may be the same as or different from any particular $R^1$ and/or $R^2$. For example, $R^3$ may be methyl, propyl, etc. In certain embodiments, each $R^3$ is methyl. Alternatively, or in addition, $R^3$ may be H, an alkoxy group, or a silyl group.

Each subscript m is independently 0 or 1, such that Y may comprise 0, 1, or 2 of the divalent hydrocarbon groups $D^2$.

Typically, each subscript m is 1. However, in certain embodiments at least one subscript m is 0.

In some embodiments, as described above, Y is branched. In such embodiments, Y may have the general formula $[D^2]_{m'}[P]$, where $D^2$ is defined above, subscript m' is ≥3 (e.g. 3, 4, 5, 6, 7, 8, 9, 10, etc.), and P is a polyether comprising at least one of the polyethers described above. For example, in some such embodiments, P is a polyether formed from a polyol (e.g. butane diol, glycerol, sorbitol, etc.) and a polyoxyalkylene (e.g. a polyoxypropylene), which is end-caped with m' number of $D^2$ moieties. In such instances, the number of alcohol functional groups composing the polyol will correspond to the maximum number of m'. However, if not all polyoxyalkylene chains extending from the polyol are endcapped, then m' will be less than the number of alcohol functional groups composing the polyol.

Each Y typically has a number average molecular weight ($M_n$) of at least about 100. In certain embodiments, at least one Y has a $M_n$ of at least 200, alternatively at least 300, alternatively at least 400, alternatively at least 500, alternatively at least 600, alternatively at least 700. In these or other embodiments, each Y has a $M_n$ of at least 200, alternatively at least 300, alternatively at least 400, alternatively at least 500, alternatively at least 600, alternatively at least 700, alternatively at least 1,000, alternatively at least 2,000, alternatively at least 4,000, alternatively at least 8,000, alternatively at least 12,000, alternatively at least 16,000, alternatively at least 25,000, alternatively at least 50,000. The number average molecular weight may be readily determined using Gel Permeation Chromatography (GPC) techniques based on polystyrene standards.

Each Z is an independently selected siloxane moiety having the formula $[R^1{}_h SiO_{(4-h)/2}]_d$. In each siloxane moiety Z, $R^1$ is as defined above. Each subscript d is from 1 to 1000, such as from 1 to 500, alternatively from 1 to 300, alternatively from 1 to 100, alternatively from 1 to 50, alternatively from 1 to 10. Each subscript h is independently selected from 0 to 2 in each moiety indicated by subscript d, such as 0, 1, or 2. Each siloxane moiety Z may independently comprise a linear siloxane, a branched siloxane, or both. Likewise, any particular siloxane moiety Z may itself comprise linear or branched segments, or comprise both linear and branched segments. As such, Z may be a linear siloxane moiety, a branched siloxane moiety, or a siloxane moiety comprising at least one linear and also at least one branched segment. In certain embodiments, Z is branched (i.e., comprises at least one branched segment).

In certain embodiments, each polyether moiety Y is linear, such that the silicone-polyether copolymer may have one of the following structures:

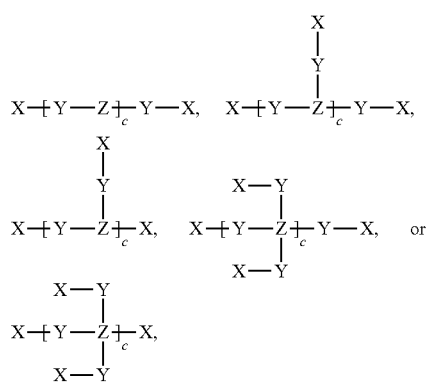

where each X, Y, Z, and subscript c are defined above. Alternatively, each polyether moiety Y may be branched. For example, the silicone-polyether copolymer may have one of the following structures:

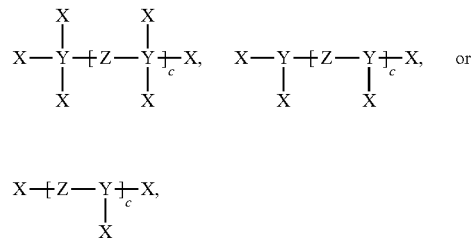

where each X, Y, Z, and subscript c are defined above. As shown in these structures, each siloxane moiety Z may be linear or branched. In particular embodiments, both polyether moiety Y and siloxane moiety Z may be branched, such that the silicone-polyether copolymer may have one of the following structures:

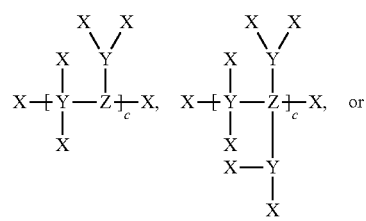

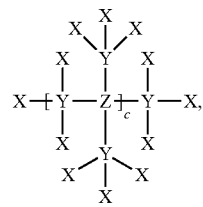

where each X, Y, Z, and subscript c are defined above.

In some embodiments, each polyether moiety Y and each siloxane moiety Z are linear, and the silicone-polyether copolymer has the following structure:

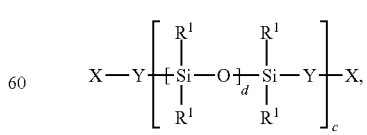

where each Y, $R^1$, subscript c, and subscript d are as defined above. For example, in some such embodiments, when each X has formula (I), the silicone-polyether copolymer has the following structure:

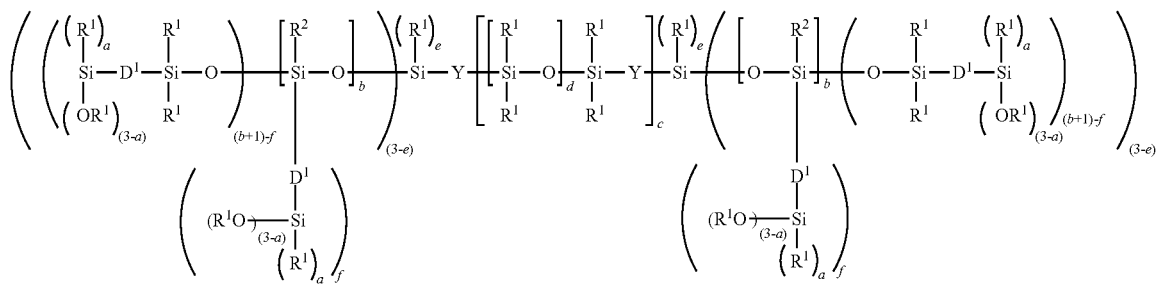

where each Y, $R^1$, $R^2$, $D^1$, subscript a, subscript b, subscript c, subscript d, subscript e, and subscript f are as defined above.

In certain embodiments, X has formula (I) and e is 1. In these embodiments, the silicone-polyether copolymer has the following structure:

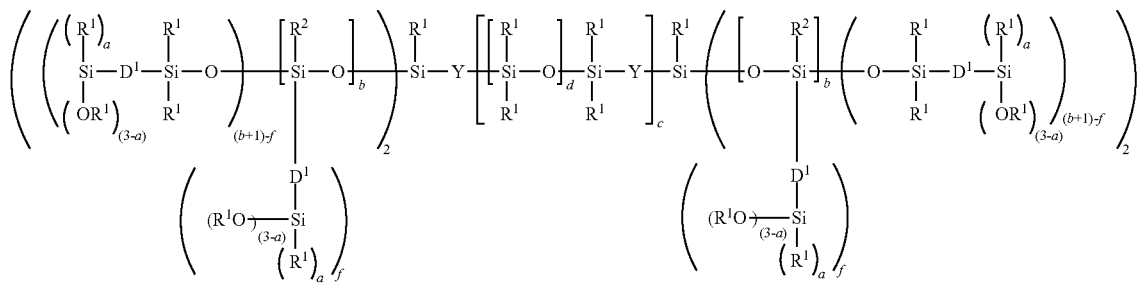

where each Y, $R^1$, $R^2$, $D^1$, subscript a, subscript b, subscript c, subscript d, and subscript f are as defined above. In some such embodiments, f is 0, and the silicone-polyether copolymer has the following structure:

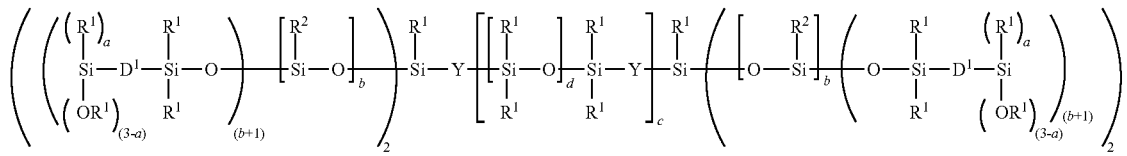

where each Y, $R^1$, $R^2$, $D^1$, subscript a, subscript b, subscript c, and subscript d are as defined above. In some of these embodiments, b is 0 and the silicone-polyether copolymer has the following structure:

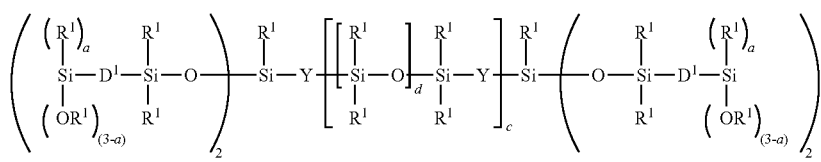

where each Y, $R^1$, $R^2$, $D^1$, subscript a, subscript c, and subscript d are as defined above. In other embodiments, b is 1 and the silicone-polyether copolymer has the following structure:

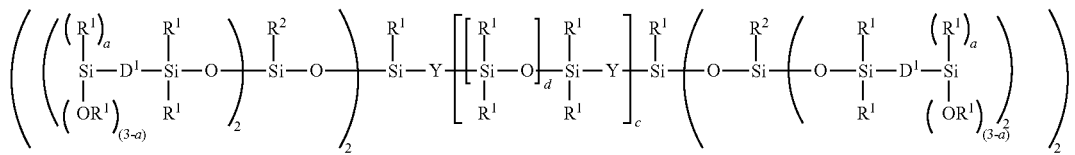

where each Y, $R^1$, $R^2$, $D^1$, subscript a, subscript c, and subscript d are as defined above. In other embodiments, f is 1 and b is 1 and the silicone-polyether copolymer has the following structure:

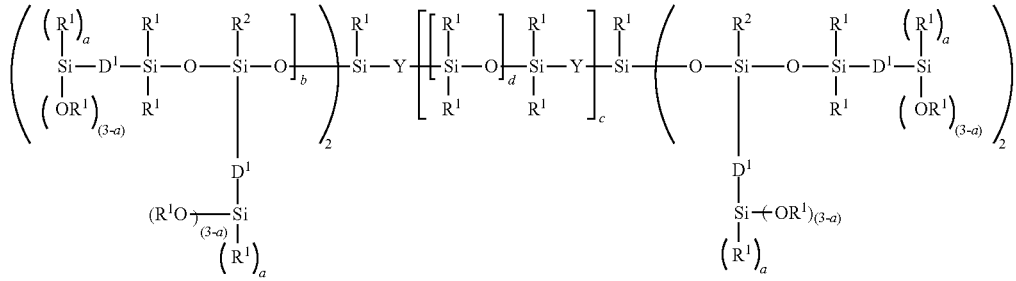

where each Y, $R^1$, $R^2$, $D^1$, subscript a, subscript b, subscript c, and subscript d are as defined above.

In some embodiments, X has formula (I) and e is 2. In these embodiments, the silicone-polyether copolymer has the following structure:

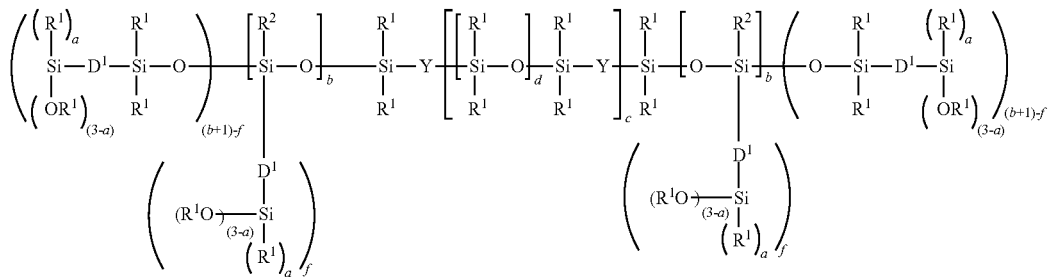

where each Y, $R^1$, $R^2$, $D^1$, subscript a, subscript b, subscript c, subscript d, and subscript f are as defined above. In some such embodiments, f is 0, and the silicone-polyether copolymer has the following structure:

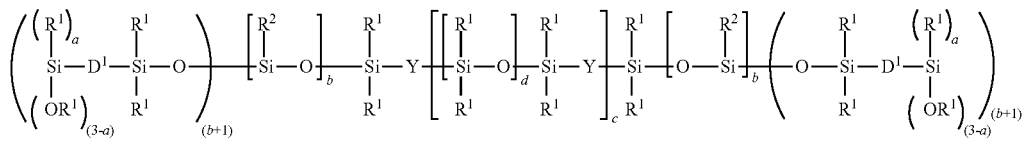

where each Y, $R^1$, $R^2$, $D^1$, subscript a, subscript b, subscript c, and subscript d are as defined above. In some of these embodiments, b is 1 and the silicone-polyether copolymer has the following structure:

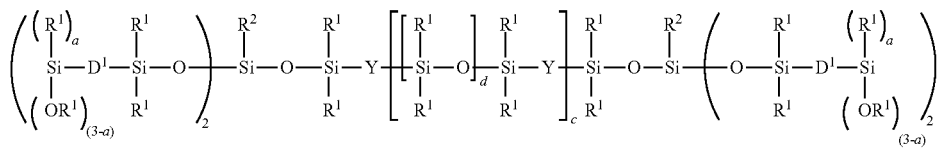

where each Y, $R^1$, $R^2$, $D^1$, subscript a, subscript c, and subscript d are as defined above. In other embodiments, b is 0 and the silicone-polyether copolymer has the following structure:

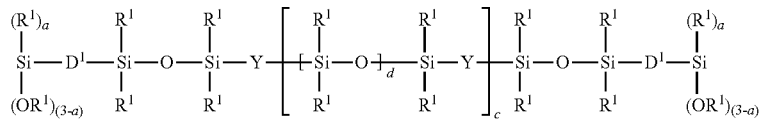

where each Y, $R^1$, $R^2$, $D^1$, subscript a, subscript c, and subscript d are as defined above. In other embodiments, f is 1 and b is 1 and the silicone-polyether copolymer has the following structure:

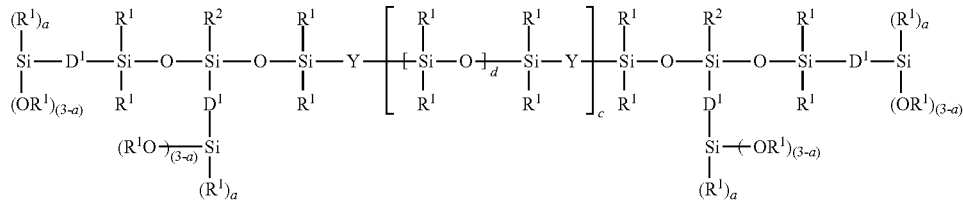

where each Y, $R^1$, $R^2$, $D^1$, subscript a, subscript c, and subscript d are as defined above.

When each X has formula (II), the silicone-polyether copolymer has the following structure:

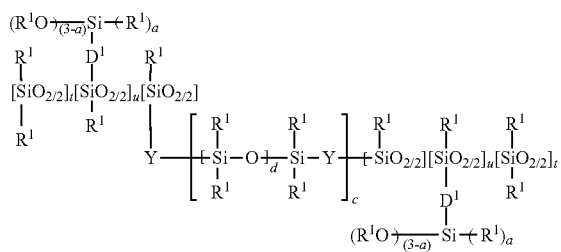

where each Y, $R^1$, $D^1$, subscript a, subscript t, and subscript u are as defined above. In such embodiments, X includes a cyclic moiety. In certain embodiments, (t+u) is from 2 to 14, alternatively from 2 to 9, alternatively from 2 to 6, alternatively from 2 to 5, alternatively 2 to 4.

The exemplary structures above are based on each X, each Y, and/or each Z in the silicone-polyether copolymer being the same. However, each X, each Y, and each Z are independently selected, as described above. As such, one of skill in the art readily understands structures associated with the silicone-polyether copolymer based on the selection of each X, each Y, and/or each Z.

A method of preparing the silicone-polyether copolymer is also disclosed. The method comprises reacting a polyether compound having on average more than one terminal unsaturated group, a chain extending organosilicon compound, and an endcapping organosilicon compound in the presence of a hydrosilylation catalyst to give the silicone-polyether copolymer.

As will be understood by one of skill in the art in view of the description herein, the polyether compound utilized in the method forms a portion of the silicone-polyether copolymer corresponding to the polyether moiety Y, the chain extending organosilicon compound utilized in the method forms a portion of the silicone-polyether copolymer corresponding to the siloxane moiety Z, and the endcapping organosilicon compound utilized in the method forms a portion of the silicone-polyether copolymer corresponding to the silicone moiety X.

Typically, the polyether compound has the formula: $Y^1[R^4]_i$, where each $R^4$ is an independently selected unsaturated group having from 2 to 14 carbon atoms; subscript i is >1; and $Y^1$ is polyether moiety comprising at least one polyether group.

Each $R^4$ is an independently selected unsaturated group having from 2 to 14 carbon atoms. Typically, $R^4$ comprises, alternatively is, an alkenyl group or an alkynyl group. Specific examples thereof include $H_2C=CH-$, $H_2C=CHCH_2-$, $H_2C=CHCH_2CH_2-$, $H_2C=CH(CH_2)_3-$, $H_2C=CH(CH_2)_4-$, $H_2C=C(CH_3)-$, $H_2C=C(CH_3)CH_2-$, $H_2C=C(CH_3)CH_2CH_2-$, $H_2C=C(CH_3)CH_2CH(CH_3)-$, $H_2C=C(CH_3)CH(CH_3)CH_2-$, $H_2C=C(CH_3)C(CH_3)_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$.

In certain embodiments, each $R^4$ has the formula $CH_2C(R^3)=[D^2]_m-$, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, and subscript m is 0 or 1. In certain embodiments, $R^3$ is —$CH_3$. In these or other embodiments, $D^2$ is —$CH_2$—. In specific embodiments, each $R^4$ is $H_2C\!=\!C(CH_3)CH_2$—.

Subscript i is >1, such as 2, 3, 4, 5, 6, etc. Generally, the polyether compound comprises an $R^4$ at each terminus of $Y^1$, such that subscript i corresponds to the valency of $Y^1$, which is at least 2, but may be 3, 4, 5, or higher depending on the branching thereof.

Each $Y^1$ is a polyether moiety comprising at least one polyether group, such as any of the polyether groups described above. Typically, the polyether group of $Y^1$ has the general formula —O—$(C_nH_{2n}O)_w$—, wherein subscript n is independently selected from 2 to 4 in each moiety indicated by subscript w, and subscript w is from 1 to 1000. In certain embodiments, at least one polyether group of $Y^1$ has the formula —O—$[C_2H_4O]_x[C_3H_6O]_y[C_4H_8O]_z$—, where each subscript x is independently from 0 to 999, each subscript y is independently from 1 to 1000, and each subscript z is independently from 0 to 999, and wherein units indicated by subscripts x, y and z may be in randomized or block form in the polyether group.

In some embodiments, $Y^1$ is branched, and has general formula $[R^4]_{i'}[P]$, where $R^4$ is defined above, subscript i' is ≥3 (e.g. 3, 4, 5, 6, 7, 8, 9, 10, etc.), and P is a branched polyether comprising at least one of the polyethers described above. For example, in some such embodiments, P is a polyether formed from a polyol (e.g. butane diol, glycerol, sorbitol, etc.) and 2, 3, or more polyoxyalkylenes (e.g. polyoxypropylenes), which is endcaped with i' number of $R^4$ moieties. In such instances, the number of alcohol functional groups composing the polyol will correspond to the maximum number of i'. However, if not all polyoxyalkylene chains extending from the polyol are endcapped, then i' will be less than the number of alcohol functional groups composing the polyol.

In certain embodiments, the polyether compound is linear and i=2, such that the polyether compound has the formula $R^4$—$Y^1$—$R^4$, where $Y^1$ and each $R^4$ are as defined above. For example, in some such embodiments, the polyether compound has the formula:

$$CH_2C(R^3)\text{-}[D^2]_m\text{-}O\text{---}[C_2H_4O]_x[C_3H_6O]_y[C_4H_8O]_z\text{-}[D^2]_m\text{---}C(R^3)CH_2,$$

wherein each $R^3$, $D^2$, subscript m, subscript x, subscript y, and subscript z are as defined above. In specific embodiments, each $R^3$ is methyl, each $D^2$ is $CH_2$, and each subscript m is 1. In these or other embodiments, subscripts x and z are each 0, such that the polyether moiety of the polyether compound contains only oxypropylene units The chain extending organosilicon compound is typically an organohydrogensiloxane having at least 2 terminal silicon-bonded H groups. However, the chain extending organosilicon compound may be branched, and have 3, 4, or more terminal silicon-bonded H groups. For example, the chain extending organosilicon compound may have one of the following formulas:

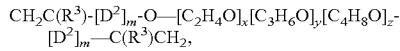

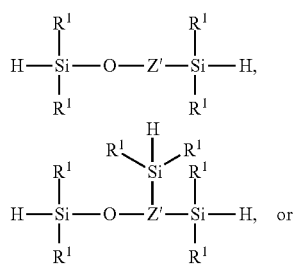

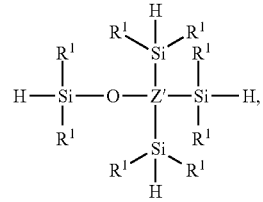

wherein Z' is a siloxane moiety and each $R^1$ is as defined above. As such, the chain extending organosilicon compound typically comprises a linear silicon hydride functional organosilicon compound, a branched silicon hydride functional organosilicon compound, or both.

In some embodiments, the chain extending organosilicon compound comprises a siloxane moiety Z' of formula $[R^1{}_{h'}SiO_{(4-h'/2)}]_{d'}$, wherein subscript d' is from 1 to 1000, subscript h' is independently selected from 0 to 2 in each moiety indicated by subscript d', and $R^1$ is as defined above. In such embodiments, the chain extending organosilicon compound typically comprises hydrides bonded to terminal silicon atoms of the siloxane moiety Z', terminal silyl groups having silicon-bonded H atoms, or a combination thereof.

In certain embodiments, the siloxane moiety Z' is linear, and the chain extending organosilicon compound is an organohydrogensiloxane having the formula:

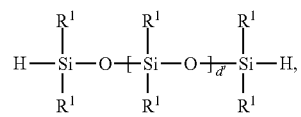

wherein each $R^1$ is as defined above, and subscript d' is from 1 to 999.

As introduced above, the endcapping organosilicon compound utilized in the method forms the silicone moiety X of formulas (I) and (II) above. As such, the endcapping organosilicon compound may be any organosilicon compound suitable for forming the silicone-polyether copolymer, as understood in the art. Typically, the endcapping organosilicon compound is an organohydrogensiloxane compound including at least one silicon-bonded hydrogen atom. The silicon-bonded hydrogen atom of the organohydrogensiloxane compound reacts with the unsaturated group $R^4$ of the polyether compound via a hydrosilylation reaction in the presence of the hydrosilylation catalyst utilized in the method.

In certain embodiments, the endcapping organosilicon compound is an organohydrogensiloxane compound having one of formulas (III) and (IV):

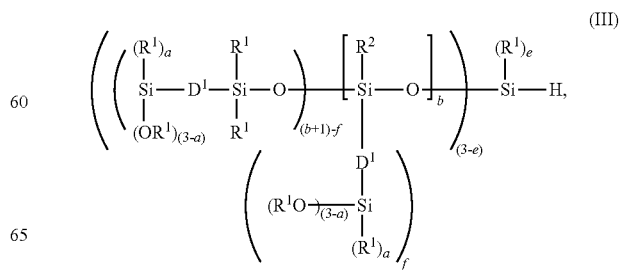

-continued

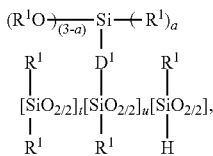

wherein each $R^1$, $R^2$, $D^1$, subscript a, subscript b, subscript e, subscript f, subscript t, and subscript u are as defined above.

As readily understood in the art, the organohydrogensiloxane of formula (III) results in the siloxane moieties of formula (I) in the silicone-polyether copolymer, and the organohydrogensiloxane of formula (IV) results in the siloxane moiety of formula (II) in the silicone-polyether copolymer.

Organohydrogensiloxane compounds of formulas (III) and (IV)) can be made via any suitable technique. The organohydrogensiloxane may be prepared in accordance with the methods disclosed in U.S. Provisional Pat. Appln. Nos. 62/524,637, 62/524,636, and 62/524,639, the subject matter of which are incorporated by reference herein.

The polyether compound, the chain extending organosilicon compound, and the endcapping organosilicon compound may be reacted in any order or combination to give the silicone-polyether copolymer, as understood in the art. In certain embodiments, the method comprises reacting the polyether compound and the chain extending organosilicon compound in the presence of the hydrosilylation catalysts to give a siloxane-polyether compound (i.e., a chain-extended silicone-polyether compound), and reacting the siloxane-polyether compound and the endcapping organosilicon compound in the presence of a hydrosilylation catalyst to give the silicone-polyether copolymer. The siloxane-polyether compound may be prepared by any suitable technique. For example, in certain embodiments, the siloxane-polyether compound is prepared by reacting the polyether compound having two terminal unsaturated groups and the chain extending organosilicon compound in the presence of a hydrosilylation catalyst to give the siloxane-polyether compound.

The siloxane-polyether compound utilized in such embodiments forms a portion of the silicone-polyether copolymer having the formula $[Z_jY_o]_c$, where Z, Y, subscript c, and subscript j, and subscript o are defined above. For example, when polyether moieties Y and siloxane moieties Z are linear, the siloxane-polyether compound may have the formula:

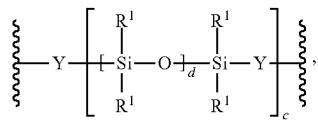

where each Y, $R^1$, subscript c, and subscript d are as defined above. Thus, the siloxane-polyether compound utilized may be selected based on the desired structure of the silicone-polyether copolymer, e.g. based on molecular weight, the particular structure of (i.e., units within) each Y, the degree of polymerization of the siloxy units represented by subscript d, etc.

In certain embodiments, the siloxane-polyether compound has the formula:

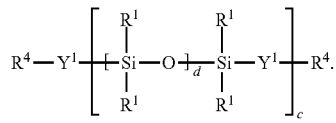

In such embodiments, each $Y^1$ and $R^1$ is as defined above, and subscript c is typically from 1 to 150, such as from 1 to 100, alternatively from 1 to 50, alternatively from 1 to 25, alternatively from 1 to 10, and alternatively from 1 to 5. Typically, each subscript d is from 1 to 1000, such as from 1 to 500, alternatively from 1 to 300, alternatively from 1 to 100, alternatively from 1 to 50, alternatively from 1 to 10, in each moiety indicated by subscript c.

The polyether compound and the chain extending organosilicon compound are typically reacted in a molar ratio of from 1.001:1 to 2:1; alternatively from 1.4:1 to 1.7:1; alternatively from 1.05:1 to 1.5:1; alternatively from 1.1:1 to 1.2:1; alternatively from 1.2:1 to 1.5:1. The siloxane-polyether compound is typically formed by the molar ratio of the polyether compound and the chain extending organosilicon compound to reach a desired value of subscript c.

The silicone-polyether compound and the endcapping organosilicon compound are typically reacted in a molar ratio between unsaturated groups of the silicone-polyether and silicon hydride groups of the endcapping organosilicon compound of from 1.5:1 to 1:1.5, alternatively from 1.4:1 to 1:1.4, alternatively from 1.3:1 to 1:1.3, alternatively from 1.2:1 to 1:1.2, alternatively from 1.1:1 to 1:1.1, alternatively from 1.1:1 to 1:1. When the silicone-polyether is difunctional, the silicone-polyether copolymer is typically formed by a 1:2 molar ratio of the silicone-polyether compound and the endcapping organosilicon compound, although a molar excess of one relative to the other may be utilized.

In certain embodiments, the method comprises reacting the polyether compound and the endcapping organosilicon compound in the presence of the hydrosilylation catalyst to give an endcapped silicone-polyether compound, and reacting the endcapped silicone-polyether compound and the chain extending organosilicon compound in the presence of the hydrosilylation catalyst to give the silicone-polyether copolymer. In these or other embodiments, the method comprises reacting at least some of the polyether compound and some of the endcapping organosilicon compound to give the endcapped silicone-polyether compound, and also reacting at least some of the polyether compound and some of the chain extending organosilicon compound to give the siloxane-polyether compound, as each described above.

The hydrosilylation-reaction catalyst is not limited and may be any known hydrosilylation-reaction catalyst for catalyzing hydrosilylation reactions. Combinations of different hydrosilylation-reaction catalysts may be utilized.

In certain embodiments, the hydrosilylation-reaction catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation-reaction catalyst.

Additional examples of catalysts suitable for the hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation-reaction catalyst.

The hydrosilylation-reaction catalyst may be in any suitable form. For example, the hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The hydrosilylation-reaction catalyst may also be disposed in a vehicle, e.g. a solvent which solubilizes the hydrosilylation-reaction catalyst, alternatively a vehicle which merely carries, but does not solubilize, the hydrosilylation-reaction catalyst. Such vehicles are known in the art.

In specific embodiments, the hydrosilylation-reaction catalyst comprises platinum. In these embodiments, the hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the hydrosilylation-reaction catalyst include 1,3-diethenyl-1,1,3,3-tetramethyldisiloxane complexes with platinum. These complexes may be microencapsulated in a resin matrix. Alternatively, the hydrosilylation-reaction catalyst may comprise 1,3-diethenyl-1,1,3,3-tetramethyldisiloxane complex with platinum. The hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)PtCl$_2$ with 0.045 mole COD and 0.0612 moles HMeSiCl$_2$, where COD represents cyclooctadiene.

Additional examples of suitable hydrosilylation catalysts for component are described in, for example, U.S. Pat. Nos. 3,159,601; 3,220,972; 3,296,291; 3,419,593; 3,516,946; 3,814,730; 3,989,668; 4,784,879; 5,036,117; and 5,175,325; the disclosures of which are incorporated herein by reference in their entireties.

The hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

A sealant comprising the silicone-polyether copolymer is also provided. More specifically, the sealant comprises: (I) a copolymer comprising the silicone-polyether copolymer; and (II) a condensation reaction catalyst.

The (II) condensation reaction catalyst is not limited and, in some embodiments, is exemplified by tin catalysts, titanium catalysts, zirconate catalysts, and zirconium catalysts. General examples of suitable tin catalysts include organotin compounds where the valence of the tin is either +4 or +2 (e.g. tin (IV) compounds and/or tin (II) compounds). Specific examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Additional examples of tin (IV) compounds are known in the art and are commercially available, such as Metatin® 740 and Fascat® 4202 from Acima Specialty Chemicals of Switzerland, Europe, which is a business unit of The Dow Chemical Company, as well as Formrez® UL-28 from Galata Chemicals of Hahnville, La. Specific examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Examples of suitable titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate, diisopropoxydi(ethoxyacetoacetyl) titanium and bis(acetoacetonyl)-diisopropoxy titanium (IV). Many of these titanium catalysts are commercially available, such as Tyzor™ DC, Tyzor™ TnBT, and Tyzor™ 9000 from Doft Ketal Specialty Catalysts LLC of Houston, Tex. In certain embodiments, the (II) condensation reaction catalyst is a titanium catalyst, such as one of those exemplified above, e.g. where the sealant is or may be formulated as a room temperature vulcanizing sealant composition. The amount of the (II) condensation reaction catalyst present in the sealant depends on various factors (e.g. the amount and/or type of the (I) copolymer, the types and/or amounts of any additional materials present in the sealant, etc.), and may be readily determined by one of skill in the art. Typically, the sealant comprises the (II) condensation reaction catalyst in an amount of from 0.2 to 6, alternatively from 0.5 to 3, parts by weight based on the total weight of the (I) copolymer present in the sealant.

In some embodiments, the sealant further comprises one or more additives. Examples of suitable additives that may be present in the sealant include fillers, treating agents (e.g. filler treating agents), cross-linkers, adhesion promotors, surface modifiers, drying agents, extenders, biocides, flame retardants, plasticizers, end-blockers, binders, anti-aging additives, water release agents, pigments, rheology modifiers, carriers, tackifying agents, corrosion inhibitors, catalyst inhibitors, viscosity modifiers, UV absorbers, antioxidants, light-stabilizers, and the like, as well as combinations thereof.

In certain embodiments, the sealant includes a filler. The filler may be or comprise a reinforcing filler, an extending filler, a conductive filler (e.g., electrically conductive, thermally conductive, or both), or the like, or a combination thereof. Examples of suitable reinforcing fillers include precipitated calcium carbonates and reinforcing silica fillers such as fume silica, silica aerogel, silica xerogel, and precipitated silica. Specific suitable precipitated calcium carbonates include Winnofil® SPM from Solvay and Ultrapflex® and Ultrapflex® 100 from Specialty Minerals, Inc. Examples of fumed silicas are known in the art and are commercially available, such as those sold under the name CAB-O-SIL by Cabot Corporation of Massachusetts, U.S.A. Examples of suitable extending fillers include crushed quartz, aluminum oxide, magnesium oxide, calcium carbonate such as ground calcium carbonate, precipitated calcium carbonate, zinc oxide, talc, diatomaceous earth, iron oxide, clays, mica, chalk, titanium dioxide, zirconia, sand, carbon black, graphite, or a combination thereof. Examples of extending fillers are known in the art and are commercially available, including ground quartz sold under the name MIN-U-SIL by U.S. Silica of Berkeley Springs, W. Va. Other examples of commercially available extending fillers include calcium carbonates sold under the name CS-11 from Imerys, G3T from Huber, Pfinyl 402 from Specialty Minerals, Inc. and Omyacarb 2T from Omya. The amount of the filler present in the sealant depends on various factors (e.g. the amount and/or type of the (I) copolymer, the types and/or amounts of any additional materials present in the sealant, etc.), and may be readily determined by one of skill in the art. The exact amount of the filler employed in a specific implementation of the sealant will also depend on whether more than one type of filler is utilized. Typically, where present, the sealant comprises the filler in an amount of from 0.1 to 95, alternatively from 1 to 60, alternatively from 1 to 20 wt. %, based on the weight of the sealant.

In particular embodiments, the sealant comprises a treating agent. The treating agent is not limited, and may be any treating agent suitable for use in treating (e.g. surface treating) an additive of the sealant, such as the filler and other additives (e.g. physical drying agents, flame retardants, pigments, and/or water release agents) which may be present in the sealant. More specifically, solid and/or particulate additives may be treated with the treating agent before being added to the sealant. Alternatively, or in addition, solid and/or particulate additives may be treated with the treating agent in situ. General examples of suitable treating agents include those comprising an alkoxysilane, an alkoxy-functional oligosiloxane, a cyclic polyorganosiloxane, a hydroxyl-functional oligosiloxane (e.g. dimethyl siloxane or methyl phenyl siloxane), a fatty acid (e.g. a stearate, such as calcium stearate), and the like, as well as combinations thereof. Specific examples of treating agents include alkylthiols, fatty acids, titanates, titanate coupling agents, zirconate coupling agents, and the like, as well as combinations thereof.

In some embodiments, the treating agent is or comprises an organosilicon filler treating agent. Examples of such organosilicon filler treating agents include compositions suitable for treating silica fillers, such as organochlorosilanes, organosiloxanes, organodisilazanes (e.g. hexaalkyl disilazane), and organoalkoxysilanes (e.g. $CH_3Si(OCH_3)_3$, $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, $C_6H_5CH_2CH_2Si(OCH_3)_3$, etc.), and the like. In these or other embodiments, the treating agent is or comprises an alkoxysilane having the formula (X): $R^{10}_A Si(OR^{11})_{4-A}$. In formula (X), subscript A is an integer of from 1 to 3, such as 1, 2, or 3, Each $R^{10}$ is an independently selected monovalent organic group, such as a monovalent hydrocarbon group having from 1 to 50 carbon atoms, alternatively from 8 to 30 carbon atoms, alternatively from 8 to 18 carbon atoms, alternatively from 1 to 5 carbon atoms. $R^{10}$ may be saturated or unsaturated, and branched or unbranched. Alternatively, $R^{10}$ may be saturated and unbranched. $R^{10}$ is exemplified by alkyl groups such as methyl, ethyl, hexyl, octyl, dodecyl, tetradecyl, hexadecyl, and octadecyl; alkenyl groups such as vinyl; and aromatic groups such as benzyl and phenylethyl. Each $R^{11}$ is an independently selected saturated hydrocarbon group having from 1 to 4 carbon atoms, alternatively from 1 to 2 carbon atoms. Specific examples of organosilicon filler treating agents also include hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

In some embodiments, the treating agent is or comprises an alkoxy-functional oligosiloxanes. Examples of suitable alkoxy-functional oligosiloxanes include those having the general formula (XI): $(R^{12}O)_B Si(OSiR^{13}_2 R^{14})_{(4-B)}$. In formula (XI), subscript B is 1, 2 or 3. In specific embodiments, subscript B is 3. Each $R^{12}$ is an independently selected alkyl group. Each $R^{13}$ is an independently selected unsaturated monovalent hydrocarbon group having from 1 to 10 carbon atoms. Each $R^{14}$ is an independently selected unsaturated monovalent hydrocarbon group having at least 10 carbon atoms.

In certain embodiments, the treating agent is or comprises a polyorganosiloxane capable of hydrogen bonding. Such treating agents utilize multiple hydrogen bonds, which are clustered and/or dispersed, as a means to tether a compatibilization moiety to a surface of the sealant component to be treated (e.g. the filler). Suitable polyorganosiloxanes capable of hydrogen bonding have an average, per molecule, of at least one silicon-bonded group capable of hydrogen bonding, which is typically selected from organic groups having multiple hydroxyl functionalities, organic groups having at least one amino functional group, and combinations thereof. In other words, the polyorganosiloxane capable of hydrogen bonding typically utilizes hydrogen bonding as a primary mode of attachment to the filler. As such, in some embodiments, the polyorganosiloxane is incapable of forming covalent bonds with the filler. The polyorganosiloxane may be free of condensable silyl groups (e.g. silicon bonded alkoxy groups, silazanes, and silanols). Examples of suitable polyorganosiloxanes for use in or as the sealant include saccharide-siloxane polymers, amino-functional polyorganosiloxanes, and a combination thereof. In specific embodiments, the sealant comprises a polyorganosiloxane comprising a saccharide-siloxane polymer.

The amount of the treating agent present in the sealant depends on various factors (e.g. the amount and/or type of the (I) copolymer, the types and/or amounts of any additional materials present in the sealant (such as those treated with the treating agent), etc.), and may be readily determined by one of skill in the art. Typically, the amount of the treating agent varies depending on the type of treating agent selected, the type and/or amount of particulates to be treated, and whether the particulates are treated before being added to the sealant or in situ. Typically, where present, the sealant comprises the treating agent in an amount of from 0.01 to 20, alternatively from 0.1 to 15, alternatively from 0.5 to 5 wt. %, based on the weight of the sealant.

In some embodiments, the sealant comprises a polymer additive, such as crosslinkers, chain extenders, plasticizers, end-blockers, and the like, or combinations thereof. In general, suitable polymer additives include compounds having functional groups that are reactive with functional groups present in the (I) copolymer of the sealant, or with functional groups present in another polymer additive that has been reacted therewith. Certain polymer additives may be named based on an intended function (e.g. to cross-link, to chain-extend, to end-block, etc.). However, it is to be appreciated that there may be overlap in functions between types of polymer additives because certain polymer additives described herein may have more than one function as will be readily appreciated by one of skill in the art. For examples, suitable crosslinkers include those comprising a compound having an average, per molecule, of two or more substituents reactive with alkoxy groups present within the (I) copolymer, and suitable chain extenders include those comprising a compound having an average, per molecule, of two substituents reactive with alkoxy groups present within the (I) copolymer or with groups present within another polymer additive reacted with the (I) copolymer. Accordingly, as is understood by those of skill in the art, various compounds may be used as a cross-linker and/or a chain extender. Similarly, various plasticizers, which are exemplified by the particular plasticizers described below, may also be interchangeably utilized in or as a crosslinker and/or a chain extender of the sealant.

In some embodiments, the sealant comprises a crosslinker. Some examples of suitable crosslinkers include silane crosslinkers having hydrolyzable groups, or partial or full hydrolysis products thereof. Examples of such silane crosslinkers include those including a silicon compound having the general formula (XII): $R^{15}_C Si(R^{16})_{(4-C)}$, where each $R^{15}$ is an independently selected monovalent hydrocarbon group, such as an alkyl group; each $R^{16}$ is a hydrolyzable substituent, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and subscriptC is 0-3, such as 0, 1, 2, or 3. Typically, subscript C has an average value greater than 2. Alternatively, subscript C may have a value ranging from 3 to 4. Typically, each $R^{16}$ is independently selected from hydroxyl, alkoxy, acetoxy, amide, or oxime. Specific examples of suitable silane crosslinkers include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

In some embodiments, the crosslinker includes an acyloxysilane, an alkoxysilane, a ketoximosilane, an oximosilane, or the like, or combinations thereof.

Examples of suitable acetoxysilane crosslinkers include tetraacetoxysilanes, organotriacetoxysilanes, diorganodiacetoxysilanes, and combinations thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. In some embodiments, the crosslinker comprises organotriacetoxysilanes, for example mixtures comprising methyltriacetoxysilane and ethyltriacetoxysilane.

Examples of suitable aminofunctional alkoxysilanes suitable for use in or as the crosslinker are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and combinations thereof.

Examples of suitable oximosilane crosslinkers include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Examples of suitable ketoximosilanes crosslinkers include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

In certain embodiments, the crosslinker comprises an alkoxysilane exemplified by a dialkoxysilane, such as a dialkyldialkoxysilane; a trialkoxysilane, such as an alkyltrialkoxysilane; a tetraalkoxysilane; partial or full hydrolysis products thereof; or a combination thereof. Examples of suitable trialkoxysilanes include methyltrimethoxysilane, vinyltrimethoxysilane, methyltriethoxysilane, ethyltrimethoxysilane, ethyltriethoxysilane, isobutyltrimethoxysilane, isobutyltriethoxysilane, and combinations thereof. Examples of suitable tetraalkoxysilanes include tetraethoxysilane. In specific embodiments, the crosslinker comprises, alternatively is, methyltrimethoxysilane.

In certain embodiments, the crosslinker is polymeric. For example, the crosslinker may comprise a disilane such as bis(triethoxysilyl)hexane), 1,4-bis[trimethoxysilyl(ethyl)] benzene, bis[3-(triethoxysilyl)propyl] tetrasulfide, bis (trimethoxysilyl)hexane), bis(triethoxysilyl)ethane, bis (trimethoxysilyl)ethane, and combinations thereof. In these or other embodiments, the crosslinker may be one single crosslinker or a combination comprising two or more crosslinkers that differ from one another, e.g. based on hydrolyzable substituents and other organic groups bonded to silicon, and, when a polymeric crosslinker is used, siloxane units, structure, molecular weight, sequence, etc.

The amount of the crosslinker present in the sealant depends on various factors (e.g. the amount and/or type of the (I) copolymer, the types and/or amounts of any additional materials present in the sealant (such as other polymer additives), the type of crosslinker utilized, etc.), and may be readily determined by one of skill in the art. In general, where present, the sealant comprises the crosslinker in an amount of from 0.5 to 15, alternatively from 1 to 10, alternatively from 3 to 10 wt. %, based on the weight of the (I) copolymer.

In some embodiments, the sealant comprises a plasticizer. Examples of suitable plasticizers include organic plasticizers, such as those comprising a carboxylic acid ester (e.g. esters), a phthalate (e.g. phthalates), a carboxylate (e.g. carboxylates), an adipate (e.g. adipates), or a combination thereof. Specific examples of suitable organic plasticizers include bis(2-ethylhexyl)terephthalate, bis(2-ethylhexyl)-1, 4-benzenedicarboxylate, 2-ethylhexyl methyl-1,4-benzenedicarboxylate, 1,2 cyclohexanedicarboxylic acid, dinonyl ester (branched and linear), bis(2-propylheptyl) phthalate, diisononyl adipate, and combinations thereof.

In certain embodiments, the plasticizer is an ester having an average, per molecule, of at least one group of formula:

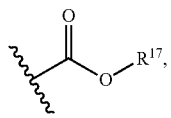

where $R^{17}$ represents a hydrogen atom or a monovalent organic group (e.g. a branched or linear monovalent hydrocarbon group, such as an alkyl group of 4 to 15 carbon atoms, alternatively 9 to 12 carbon atoms). In these or other embodiments, the plasticizer has an average, per molecule, of at least two groups of the formula above each bonded to carbon atoms in a cyclic hydrocarbon. In such instances, the plasticizer may have general formula:

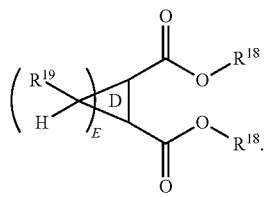

In this formula, D is a carbocyclic group having 3 or more carbon atoms, alternatively 3 to 15 carbon atoms, which may be unsaturated, saturated, or aromatic. Subscript E is from 1 to 12. Each $R^{18}$ is independently a branched or linear monovalent hydrocarbon group, such as an alkyl group of 4 to 15 carbon atoms (e.g. an alkyl group such as methyl, ethyl, butyl, etc.). Each $R^{19}$ is independently a hydrogen atom or a branched or linear, substituted or unsubstituted, monovalent organic group. For example, in some embodiments, at least one $R^{19}$ is a moiety comprising an ester functional group.

In specific embodiments, the sealant comprises a polymeric plasticizer. Examples of polymeric plasticizers include alkenyl polymers (e.g. those obtained by polymerizing vinyl or allyl monomers via various methods); polyalkylene glycol esters (e.g. diethylene glycol dibenzoates, triethylene glycols, dibenzoate pentaerythritol esters, etc.); polyester plasticizers (e.g. those obtained from dibasic acids such as sebacic acid, adipic acid, azelaic acid, phthalic acid, etc. and dihydric alcohols such as ethylene glycol, diethylene glycol, triethylene glycol, propylene glycol, dipropylene glycol, etc.); polyethers including polyether polyols each having a molecular weight of not less than 500 (e.g. polyethylene glycols, polypropylene glycols, polytetramethylene glycols, etc.); polystyrenes (e.g. polystyrene, poly-alpha-methylstyrene, etc.); polybutenes and polybutadienes (e.g. polyisobutylene, butadiene acrylonitrile, etc.); and polychloroprenes. In various embodiments, a low molecular weight plasticizer and a higher molecular weight polymeric plasticizer may present in the sealant in combination.

Specific plasticizers are known in the art and are commercially available. Such plasticizers may be present in the sealant alone or in combination. For example, the plasticizer may comprise a phthalate, such as: a dialkyl phthalate such as dibutyl phthalate (Eastman™ DBP Plasticizer), diheptyl phthalate, diisononyl phthalate, di(2-ethylhexyl) phthalate, or diisodecyl phthalate (DIDP), bis(2-propylheptyl) phthalate (BASF Palatinol® DPHP), di(2-ethylhexyl) phthalate (Eastman™ DOP Plasticizer), dimethyl phthalate (Eastman™ DMP Plasticizer); diethyl phthalate (Eastman™ DMP Plasticizer); butyl benzyl phthalate, and bis(2-ethylhexyl)terephthalate (Eastman™ 425 Plasticizer); a dicarboxylate such as Benzyl, C7-C9 linear and branched alkyl esters, 1, 2, benzene dicarboxylic acid (Ferro SANTICIZER® 261A), 1,2,4-benzenetricarboxylic acid (BASF Palatinol® TOTM-I), bis(2-ethylhexyl)-1,4-benzenedicarboxylate (Eastman™ 168 Plasticizer); 2-ethylhexyl methyl-1,4-benzenedicarboxylate; 1,2 cyclohexanedicarboxylic acid, dinonyl ester, branched and linear (BASF Hexamoll®DINCH); diisononyl adipate; trimellitates such as trioctyl trimellitate (Eastman™ TOTM Plasticizer); triethylene glycol bis(2-ethylhexanoate) (Eastman™ TEG-EH Plasticizer); triacetin (Eastman™ Triacetin); nonaromatic dibasic acid esters such as dioctyl adipate, bis(2-ethylhexyl) adipate (Eastman™ DOA Plasticizer and Eastman™ DOA Plasticizer, Kosher), di-2-ethylhexyladipate (BASF Plastomoll® DOA), dioctyl sebacate, dibutyl sebacate and diisodecyl succinate; aliphatic esters such as butyl oleate and methyl acetyl recinolate; phosphates such as tricresyl phosphate and tributyl phosphate; chlorinated paraffins; hydrocarbon oils such as alkyldiphenyls and partially hydrogenated terphenyls; process oils; epoxy plasticizers such as epoxidized soybean oil and benzyl epoxystearate; tris(2-ethylhexyl)ester; a fatty acid ester; and a combination thereof. Examples of other suitable plasticizers and their commercial sources include BASF Palamoll® 652 and Eastman 168 Xtreme™ Plasticizer.

The amount of the plasticizer present in the sealant depends on various factors (e.g. the amount and/or type of the (I) copolymer, the types and/or amounts of any additional materials present in the sealant (such as other polymer additives), the type of crosslinker utilized, etc.), and may be readily determined by one of skill in the art. In general, where present, the sealant comprises the plasticizer in an amount of from 5 to 150 parts by weight based on the combined weights of all components in the sealant. In specific embodiments, the sealant comprises the plasticizer in an amount of from 0.1 to 10 wt. % based on the total weight of the sealant.

In some embodiments, the sealant comprises an extender. Examples of suitable extenders include non-functional polyorganosiloxanes, such as those comprising difunctional units of the formula $R^{20}{}_2SiO_{2/2}$ and terminal units of the formula $R^{21}{}_3SiD'$-, where each $R^{20}$ and each $R^{21}$ are independently a monovalent organic group such as a monovalent hydrocarbon group exemplified by alkyl such as methyl, ethyl, propyl, and butyl; alkenyl such as vinyl, allyl, and hexenyl; aryl such as phenyl, tolyl, xylyl, and naphthyl; and aralkyl groups such as phenylethyl; and D' is an oxygen atom or a divalent group. Non-functional polyorganosiloxanes are known in the art and are commercially available. Suitable non-functional polyorganosiloxanes are exemplified by, but not limited to, polydimethylsiloxanes. Such polydimethylsiloxanes include DOWSIL® 200 Fluids, which are commercially available from Dow Silicones Corporation of Midland, Mich., U.S.A. and may have viscosity ranging from $5 \times 10^{-5}$ to 0.1, alternatively from $5 \times 10^{-5}$ to 0.05, and alternatively from 0.0125 to 0.06, $m^2/s$. The amount of the extender present in the sealant depends on various factors (e.g. the amount and/or type of the (I) copolymer, the types and/or amounts of any additional materials present in the sealant (such as other polymer additives), the type of crosslinker utilized, etc.), and may be readily determined by one of skill in the art. In general, where present, the sealant comprises the extender in an amount of from 0.1 to 10 wt. % based on the total weight of the sealant.

In some embodiments, the sealant comprises an end-blocker. Suitable end-blockers comprise an M unit, i.e., a siloxane unit of formula $R^{22}{}_3SiO_{1/2}$, where each $R^{22}$ independently represents a monovalent organic group, such as a monovalent hydrocarbon group. General examples of such end-blockers include those comprising a polyorganosiloxane (e.g. a polydiorganosiloxane, such as a polydimethylsiloxane) that is end-blocked at one terminus by a triorganosilyl group, e.g. $(CH_3)_3SiO$—, and at another terminus by a hydroxyl group. Other examples of suitable end-blockers include polydiorganosiloxanes having both hydroxyl end groups and triorganosilyl end groups, such as those having more than 50%, alternatively more than 75%, of the total end groups as hydroxyl groups. The amount of triorganosilyl group present in such end-blockers may vary, and is typically used to regulate the modulus of the reaction product prepared by condensation reaction of the sealant. Without wishing to be bound by theory, it is thought that higher concentrations of triorganosilyl end groups may provide a lower modulus in certain cured products. In some embodiments, the end-blocker of the sealant comprises a single end-blocking compound. However, in other embodiments, the end-blocker of sealant comprises two or more different end-blocking compounds that differ from one another, e.g. by way of properties including structure, viscosity, average molecular weight, polymer units, sequence, etc., or combinations thereof. The amount of the end-blocker present in the sealant depends on various factors (e.g. the amount and/or type of the (I) copolymer, the types and/or amounts of any additional materials present in the sealant (such as other polymer additives), the type of end-blocker utilized, etc.), and may be readily determined by one of skill in the art. In general, where present, the sealant comprises the end-blocker in an amount of from 0 to 50, alternatively from 0 to 30, alternatively from 0 to 15, wt. %, based on the total weight of the (I) copolymer.

In certain embodiments, the sealant comprises a surface modifier. Suitable surface modifiers include adhesion promoters, release agents, and the like, as well as combinations thereof. Typically, the surface modifier is utilized to change the appearance of the surface of a reaction product of the sealant. For example, the surface modifier may be used to increase gloss of the surface of such a reaction product. Specific examples of suitable surface modifiers include polydiorganosiloxanes with alkyl and aryl groups. For example, DOWSIL® 550 Fluid is a trimethylsiloxy-terminated poly(dimethyl/methylphenyl)siloxane with a viscosity of 0.000125 $m^2/s$ that is commercially available from Dow Silicones Corporation. These and other examples of suitable surface modifiers include natural oils (e.g. those obtained from a plant or animal source), such as linseed oil, tung oil, soybean oil, *Castor* oil, fish oil, hempseed oil, cottonseed oil, oiticica oil, rapeseed oil, and the like, as well as combinations thereof.

In some embodiments, the surface modifier is an adhesion promoter. Suitable adhesion promoters may comprise a hydrocarbonoxysilane such as an alkoxysilane, a combination of an alkoxysilane and a hydroxy-functional polyorganosiloxane, an amino functional silane, an epoxy functional silane, a mercaptofunctional silane, or a combination thereof. Adhesion promoters are known in the art and may comprise silanes having the formula $R^{23}{}_FR^{24}{}_GSi(OR25)_{4-(F+G)}$ where each $R^{23}$ is independently a monovalent organic group having at least 3 carbon atoms; $R^{24}$ contains at least one SiC bonded substituent having an adhesion-promoting group, such as amino, epoxy, mercapto or acrylate groups; each $R^{25}$ is independently a monovalent organic group (e.g. methyl, ethyl, propyl, butyl, etc.); subscript F has a value ranging from 0 to 2; subscript G is either 1 or 2; and the sum of (F+G) is not greater than 3. In certain embodiments, the adhesion promoter comprises a partial condensate of the above silane. In these or other embodiments, the adhesion promoter comprises a combination of an alkoxysilane and a hydroxy-functional polyorganosiloxane.

In some embodiments, the adhesion promoter comprises an unsaturated or epoxy-functional compound. In such embodiments, the adhesion promoter may be or comprise an unsaturated or epoxy-functional alkoxysilane such as those having the formula (XIII): $R^{26}{}_HSi(OR^{27})_{(4-H)}$, where subscript H is 1, 2, or 3, alternatively subscript H is 1. Each $R^{26}$ is independently a monovalent organic group with the proviso that at least one $R^{26}$ is an unsaturated organic group or an epoxy-functional organic group. Epoxy-functional organic groups for $R^{26}$ are exemplified by 3-glycidoxypropyl and (epoxycyclohexyl)ethyl. Unsaturated organic groups for $R^{26}$ are exemplified by 3-methacryloyloxypropyl, 3-acryloyloxypropyl, and unsaturated monovalent hydrocarbon groups such as vinyl, allyl, hexenyl, undecylenyl. Each $R^{27}$ is independently a saturated hydrocarbon group of 1 to 4 carbon atoms, alternatively 1 to 2 carbon atoms. $R^{27}$ is exemplified by methyl, ethyl, propyl, and butyl.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

In some embodiments, the adhesion promoter comprises an epoxy-functional siloxane, such as a reaction product of a hydroxy-terminated polyorganosiloxane with an epoxy-functional alkoxysilane (e.g. such as one of those described above), or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

In certain embodiments, the adhesion promoter comprises an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, N-(3-(trimethoxysilyl)propyl)ethylenediamine, and the like, as well as combinations thereof. In these or other embodiments, the adhesion promoter comprises a mercaptofunctional alkoxysilane, such as 3-mercaptopropyltrimethoxysilane or 3-mercaptopropyltriethoxysilane.

Additional examples of surface modifiers include adhesion promoters which are the reaction product of an epoxyalkylalkoxysilane, such as 3-glycidoxypropyltrimethoxysilane, and an amino-substituted alkoxysilane, such as 3-aminopropyltrimethoxysilane, optionally with an alkylalkoxysilane, such as methyltrimethoxysilane.

In some embodiments, the surface modifier comprises, alternatively is, a release agent. Suitable release agents are exemplified by fluorinated compounds, such as fluoro-functional silicones, or fluoro-functional organic compounds. In specific embodiments, the sealant comprises multiple surface modifiers, such as one or more adhesion promoters, one or more release agents, one or more natural oils, or combinations thereof.

The amount of the surface modifier present in the sealant depends on various factors (e.g. the amount and/or type of the (I) copolymer, the types and/or amounts of any additional materials present in the sealant, curing conditions to which the sealant is intended to be exposed, etc.), and may be readily determined by one of skill in the art. In general, where present, the sealant comprises the surface modifier in an amount of from 0.01 to 50, alternatively from 0.01 to 10, alternatively from 0.01 to 5 parts by weight, based on the combined weights of all components in the sealant.

In certain embodiments, the sealant comprises a drying agent, such as physical drying agents (e.g. adsorbents), chemical drying agents, etc. In general, the drying agent binds water and low-molecular weight alcohol from various sources. For example, the drying agent may bind by-products of a condensation reaction involving the (I) copolymer, such as water and alcohols. Physical drying agents typically trap and/or adsorb such water and/or by-products, where chemical drying agents typically binding the water and/or other by-products by chemical means (e.g. via covalent bonding). Examples of suitable drying agents for use in the sealant include adsorbents, such as those comprising inorganic particulates. Such adsorbents typically have a particle size of 10 micrometers or less, alternatively 5 micrometers or less, and an average pore size sufficient to adsorb water and low-molecular weight alcohol alcohols (e.g. an average pore size of 10 Å (Angstroms) or less, alternatively 5 Å or less, alternatively 3 Å or less). Specific examples of such adsorbents include zeolites (e.g. chabasite, mordenite, and analcite) and molecular sieves comprising alkali metal alumino silicates, silica gel, silica-magnesia gel, activated carbon, activated alumina, calcium oxide, and combinations thereof. Examples of commercially available drying agents include dry molecular sieves, such as 3 Å (Angstrom) molecular sieves sold under the trademark SYLOSIV® by Grace Davidson and under the trade name PURMOL by Zeochem of Louisville, Ky., U.S.A., and 4 Å molecular sieves sold under the trade name Doucil zeolite 4A by Ineos Silicas of Warrington, England. Other examples of suitable drying agents include: MOLSIV ADSORBENT TYPE 13X, 3A, 4A, and 5A molecular sieves, all of which are commercially available from UOP of Illinois, U.S.A.; SILIPORITE NK 30AP and 65xP molecular sieves from Atofina of Philadelphia, Pa., U.S.A.; and molecular sieves available from W.R. Grace of Maryland, U.S.A. under various names. Examples of chemical drying agents include silanes, such as those described above with respect to the crosslinker. For example, alkoxysilanes suitable as drying agents include vinyltrimethoxysilane, vinyltriethoxysilane, and combinations thereof. As understood by those of skill in the art, the chemical drying agent may be added to the sealant, or to a part of the sealant (e.g. where the sealant is a multiple-part composition) to keep the sealant or part thereof free from water. As such, the drying agent may be added to a part (e.g. a dry part) of the sealant prior to the sealant being formed, thereby rendering the part shelf stable. Alternatively, or additionally, the drying agent may keep the sealant free from water after formulation (e.g. after the parts of the sealant are combined/mixed together). The amount of the drying agent present in the sealant depends on various factors (e.g. the amount and/or type of the (I) copolymer, the types and/or amounts of any additional materials present in the sealant, curing conditions to which the sealant is intended to be exposed, etc.), and may be readily determined by one of skill in the art. In general, where present, the sealant comprises the drying agent in an amount of from 0.1 to 5 parts by weight, based on the combined weights of all components in the sealant.

In some embodiments, the sealant comprises a biocide. General examples of suitable biocides include fungicides, herbicides, pesticides, antimicrobials, and the like, as well as combinations thereof. For example, in certain embodiments, the biocide comprises, alternatively is, a fungicide. Specific examples of the fungicide include N-substituted benzimidazole carbamates and benzimidazolyl carbamates, such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-O-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate; 10,10'-oxybisphenoxarsine (trade name: Vinyzene, OBPA); di-iodomethyl-para-tolylsulfone; benzothiophene-2-cyclohexylcarboxamide-S,S-dioxide; N-(fluordichloridemethylthio)phthalimide (trade names: Fluor-Folper, Preventol A3); methyl-benzimideazol-2-ylcarbamate (trade names: Carbendazim, Preventol BCM); Zinc-bis(2-pyridylthio-1-oxide); zinc pyrithione; 2-(4-thiazolyl)-benzimidazol; N-phenyl-iodpropargylcarbamate; N-octyl-4-isothiazolin-3-on; 4,5-dichloride-2-n-octyl-4-isothiazolin-3-on; N-butyl-1,2-benzisothiazolin-3-on; triazolyl-compounds, such as tebuconazol; and the like, as well as combinations thereof. In particular embodiments, such fungicides are utilized in combination with one or more inorganic materials, such as mineral (e.g. zeolites), metals (e.g. copper, silver, platinum, etc.), and combinations thereof.

In particular embodiments, the biocide comprises, alternatively is, an herbicide. Specific examples of the herbicide include amide herbicides such as allidochlor N,N-diallyl-2-chloroacetamide; CDEA 2-chloro-N,N-diethylacetamide; etnipromid (RS)-2-[5-(2,4-dichlorophenoxy)-2-nitrophenoxy]-N-ethylpropionamide; anilide herbicides such as cisanilide cis-2,5-dimethylpyrrolidine-1-carboxanilide; flufenacet 4'-fluoro-N-isopropyl-2-[5-(trifluoromethyl)-1,3,4-thiadiazol-2-yloxy]acetanilide; naproanilide (RS)-α-2-naphthoxypropionanilide; arylalanine herbicides such as benzoylprop N-benzoyl-N-(3,4-dichlorophenyl)-DL-alanine; flamprop-M N-benzoyl-N-(3-chloro-4-fluorophenyl)-D-alanine; chloroacetanilide herbicides such as butachlor N-butoxy methyl-2-chloro-2',6'-diethylacetanilide; metazachlor 2-chloro-N-(pyrazol-1-ylmethyl)acet-2',6'-xylidide; prynachlor (RS)-2-chloro-N-(1-methylprop-2-ynyl) acetanilide; sulphonanilide herbicides such as cloransulam 3-chloro-2-(5-ethoxy-7-fluoro[1,2,4]triazolo[1,5-c]pyrimidin-2-ylsulphonamido)benzoic acid; metosulam 2',6'-dichloro-5,7-dimethoxy-3'-methyl[1,2,4]triazolo[1,5-a]pyrimidine-2-sulphonanilide; antibiotic herbicides such as bilanafos 4-[hydroxy(methyl)phosphinoyl]-L-homoalanyl-L-alanyl-L-alanine; benzoic acid herbicides such as chloramben 3-amino-2,5-dichlorobenzoic acid; 2,3,6-TBA 2,3,6-trichlorobenzoic acid; pyrimidinyloxybenzoic acid herbicides such as bispyribac 2,6-bis(4,6-dimethoxypyrimidin-2-yloxy)benzoic acid; pyrimidinylthiobenzoic acid herbicides such as pyrithiobac 2-chloro-6-(4,6-dimethoxypyrimidin-2-ylthio)benzoic acid; phthalic acid herbicides such as chlorthal tetrachloroterephthalic acid; picolinic acid herbicides such as aminopyralid 4-amino-3,6-dichloropyridine-2-carboxylic acid; quinolinecarboxylic acid herbicides such as quinclorac 3,7-dichloroquinoline-8-carboxylic acid; arsenical herbicides such as CMA calcium bis(hydrogen methylarsonate); MAMA ammonium hydrogen methylarsonate; sodium arsenite; benzoylcyclohexanedione herbicides such as mesotrione 2-(4-mesyl-2-nitrobenzoyl)cyclohexane-1,3-dione; benzofuranyl alkylsulphonate herbicides such as benfuresate 2,3-dihydro-3,3-dimethylbenzofuran-5-yl ethanesulphonate; carbamate herbicides such as carboxazole methyl 5-tert-butyl-1,2-oxazol-3-ylcarbamate; fenasulam methyl 4-[2-(4-chloro-o-tolyloxy)acetamido] phenylsulphonylcarbamate; carbanilate herbicides such as BCPC (RS)-sec-butyl 3-chlorocarbanilate; desmedipham ethyl 3-phenylcarbamoyloxyphenylcarbamate; swep methyl 3,4-dichlorocarbanilate; cyclohexene oxime herbicides such as butroxydim (RS)-(EZ)-5-(3-butyryl-2,4,6-trimethylphenyl)-2-(1-ethoxyiminopropyl)-3-hydroxycyclohex-2-en-1-one; tepraloxydim (RS)-(EZ)-2-{1-[(2E)-3-chloroallyloxyimino]propyl}-3-hydroxy-5-perhydropyran-4-ylcyclohex-2-en-1-one; cyclopropylisoxazole herbicides such as isoxachlortole 4-chloro-2-mesylphenyl 5-cyclopropyl-1,2-oxazol-4-yl ketone; dicarboximide herbicides such as flumezin 2-methyl-4-(α,α,α-trifluoro-m-tolyl)-1,2,4-oxadiazinane-3,5-dione; dinitroaniline herbicides such as ethalfluralin N-ethyl-α,α,α-trifluoro-N-(2-methylallyl)-2,6-dinitro-p-toluidine; prodiamine 5-dipropylamino-α,α,α-trifluoro-4,6-dinitro-o-toluidine; dinitrophenol herbicides such as dinoprop 4,6-dinitro-o-cymen-3-ol; etinofen α-ethoxy-4,6-dinitro-o-cresol; diphenyl ether herbicides such as ethoxyfen O-[2-chloro-5-(2-chloro-α,α,α-trifluoro-p-tolyloxy)benzoyl]-L-lactic acid; nitrophenyl ether herbicides such as aclonifen 2-chloro-6-nitro-3-phenoxyaniline; nitrofen 2,4-dichlorophenyl 4-nitrophenyl ether; dithiocarbamate herbicides such as dazomet 3,5-dimethyl-1,3,5-thiadiazinane-2-thione; halogenated aliphatic herbicides such as dalapon 2,2-dichloropropionic acid; chloroacetic acid; imidazolinone herbicides such as imazapyr (RS)-2-(4-isopropyl-4-methyl-5-oxo-2-imidazolin-2-yl)nicotinic acid; inorganic herbicides such as disodium tetraborate decahydrate; sodium azide; nitrile herbicides such as chloroxynil 3,5-dichloro-4-hydroxybenzonitrile; ioxynil 4-hydroxy-3,5-diiodobenzonitrile; organophosphorus herbicides such as anilofos S-4-chloro-N-isopropylcarbaniloylmethyl O,O-dimethyl phosphorodithioate; glufosinate 4-[hydroxy(methyl) phosphinoyl]-DL-homoalanine; phenoxy herbicides such as clomeprop (RS)-2-(2,4-dichloro-m-tolyloxy)propionanilide; fenteracol 2-(2,4,5-trichlorophenoxy)ethanol; phenoxyacetic herbicides such as MCPA (4-chloro-2-methylphenoxy)acetic acid; phenoxybutyric herbicides such as MCPB 4-(4-chloro-o-tolyloxy)butyric acid; phenoxypropionic herbicides such as fenoprop (RS)-2-(2,4,5-trichlorophenoxy) propionic acid; aryloxyphenoxypropionic herbicides such as isoxapyrifop (RS)-2-[2-[4-(3,5-dichloro-2-pyridyloxy)phenoxy]propionyl]isoxazolidine; phenylenediamine herbicides such as dinitramine N1,N1-diethyl-2,6-dinitro-4-trifluoromethyl-m-phenylenediamine, pyrazolyloxyacetophenone herbicides such as pyrazoxyfen 2-[4-(2,4-dichlorobenzoyl)-1,3-dimethylpyrazol-5-yloxy] acetophenone; pyrazolylphenyl herbicides such as pyraflufen 2-chloro-5-(4-chloro-5-difluoromethoxy-1-methylpyrazol-3-yl)-4-fluorophenoxyacetic acid; pyridazine herbicides such as pyridafol 6-chloro-3-phenylpyridazin-4-ol; pyridazinone herbicides such as chloridazon 5-amino-4-chloro-2-phenylpyridazin-3(2H)-one; oxapyrazon 5-bromo-1,6-dihydro-6-oxo-1-phenylpyridazin-4-yloxamic acid; pyridine herbicides such as fluoroxypyr 4-amino-3,5-dichloro-6-fluoro-2-pyridyloxyacetic acid; thiazopyr methyl 2-difluoromethyl-5-(4,5-dihydro-1,3-thiazol-2-yl)-4-isobutyl-6-trifluoromethylnicotinate; pyrimidinediamine herbicides such as iprymidam 6-chloro-N4-isopropylpyrimidine-2,4-diamine; quaternary ammonium herbicides such as diethamquat 1,1'-bis(diethylcarbamoylmethyl)-4,4'-bipyridinium; paraquat 1,1'-dimethyl-4,4'-bipyridinium; thiocarbamate herbicides such as cycloate S-ethyl cyclohexyl(ethyl)thiocarbamate; tiocarbazil S-benzyl di-sec-butylthiocarbamate; thiocarbonate herbicides such as EXD O,O-diethyl dithiobis(thioformate); thiourea herbicides such as methiuron 1,1-dimethyl-3-m-tolyl-2-thiourea; triazine herbicides such as triaziflam (RS)—N-[2-(3,5-dimethylphenoxy)-1-methylethyl]-6-(1-fluoro-1-methylethyl)-1,3,5-triazine-2,4-diamine; chlorotriazine herbicides such as cyprazine 6-chloro-N2-cyclopropyl-N4-isopropyl-1,3,5-triazine-2,4-diamine; propazine 6-chloro-A2,N4-di-isopropyl-1,3,5-triazine-2,4-diamine; methoxytriazine herbicides such as prometon N2,N4-di-isopropyl-6-methoxy-1,3,5-triazine-2,4-diamine; methylthiotriazine herbicides such as cyanatryn 2-(4-ethylamino-6-methylthio-1,3,5-triazin-2-ylamino)-2-methylpropionitrile; triazinone herbicides such as hexazinone 3-cyclohexyl-6-dimethylamino-1-methyl-1,3,5-triazine-2,4(1H,3H)-dione; triazole herbicides such as epronaz N-ethyl-N-propyl-3-propylsulphonyl-1H-1,2,4-triazole-1-carboxamide; triazolone herbicides such as carfentrazone (RS)-2-chloro-3-{2-chloro-5-[4-(difluoromethyl)-4,5-dihydro-3-methyl-5-oxo-1H-1,2,4-triazol-1-yl]-4-fluorophenyl}propionic acid; triazolopyrimidine herbicides such as florasulam 2',6',8-trifluoro-5-methoxy[1,2,4]triazolo[1,5-c]pyrimidine-2-sulphonanilide; uracil herbicides such as flupropacil isopropyl 2-chloro-5-(1,2,3,6-tetrahydro-3-methyl-2,6-dioxo-4-trifluoromethylpyrimidin-1-yl)benzoate; urea herbicides such as cycluron 3-cyclo-octyl-1,1-dimethylurea; monisouron 1-(5-tert-butyl-1,2-oxazol-3-yl)-3-methylurea; phenylurea herbicides such as chloroxuron 3-[4-(4-chlorophenoxy)phenyl]-1,1-dimethylurea; siduron 1-(2-methylcyclohexyl)-3-phenylurea; pyrimidinylsulphonylurea herbicides such as flazasulphuron 1-(4,6-dimethoxypyrimidin-2-yl)-3-(3-trifluoromethyl-2-pyridylsulphonyl)urea; pyrazosulphuron 5-[(4,6-dimethoxypyrimidin-2-ylcarbamoyl)sulphamoyl]-1-methylpyrazole-4-carboxylic acid; triazinylsulphonylurea herbicides such as thifensulphuron 3-(4-methoxy-6-methyl-1,3,5-triazin-2-ylcarbamoylsulphamoyl)thiophene-2-carboxylic acid; thiadiazolylurea herbicides such as tebuthiuron 1-(5-tert-butyl-1,3,4-thiadiazol-2-yl)-1,3-dimethylurea; and/or unclassified herbicides such as chlorfenac (2,3,6-trichlorophenyl)acetic acid; methazole 2-(3,4-dichlorophenyl)-4-methyl-1,2,4-oxadiazolidine-3,5-dione; tritac (RS)-1-(2,3,6-trichlorobenzyloxy)propan-2-ol; 2,4-D, chlorimuron, and fenoxaprop; and the like, as well as combinations thereof.

In some embodiments, the biocide comprises, alternatively is, a pesticide. General examples of the pesticide include insect repellents such as N,N-diethyl-meta-toluamide, and pyrethroids such as pyrethrin. Specific examples of the pesticide include atrazine, diazinon, and chlorpyrifos. In these or other embodiments, the biocide comprises, alternatively is, an antimicrobial agent. The type and nature of the antimicrobial agent may vary, and can be readily determined by one of skill in the art. Specific antimicrobial agents are commercially available, and include DOWSIL® 5700 and DOWSIL® 5772, which are from Dow Silicones Corporation of Midland, Mich., U.S.A. In certain embodiments, the biocide comprises, alternatively is, a boron-containing material, such as a boric anhydride, borax, or a disodium octaborate tetrahydrate. In various embodiments, the sealant comprises two or more biocides, which are each independently selected from the fungicide, herbicide pesticide, antimicrobial, and other biocidal components exemplified herein.

The amount of the biocide present in the sealant depends on various factors (e.g. the type of biocide(s) utilized, the amount and/or type of the (I) copolymer, an intended use of the sealant, curing conditions to which the sealant is intended to be exposed, etc.), and may be readily determined by one of skill in the art. In general, where present, the sealant comprises the biocide, or a combination of biocides, in an amount of from 0.01 to 10, alternatively from 0.1 to 5 wt. % based on the total weight of the sealant.

In particular embodiments, the sealant comprises a flame retardant. Examples of suitable flame retardants include organic/carbonaceous flame retardants (e.g. carbon black, etc.), inorganic/mineral-based flame retardants (e.g. hydrated aluminum hydroxide, silicates such as wollastonite, metal complexes of platinum and/or platinum, etc.) and the like, as well as combinations thereof. Additional examples of suitable flame retardants include halogen-based flame retardants, such as decabromodiphenyloxide, octabromordiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy)ethane, bis-(pentabromophenoxy)ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene, and PVC; phosphorus based flame-retardants, such as (2,3-dibromopropyl)-phosphate, phosphorus, cyclic phosphates, triaryl phosphates, bis-melaminium pentate, pentaerythritol bicyclic phosphate, dimethylmethylphosphate, phosphine oxide diol, triphenyl phosphate, tris-(2-chloroethyl)phosphate, phosphate esters such as tricreyl-, trixylenyl-, isodecyl diphenyl-, ethylhexyl diphenyl-, trioctyl-, tributyl-, and tris-butoxyethyl phosphate esters, and phosphate salts of various amines (e.g. ammonium phosphate); tetraalkyl lead compounds, such as tetraethyl lead; iron pentacarbonyl; manganese methyl cyclopentadienyl tricarbonyl; melamine and derivatives thereof, such as melamine salts; guanidine; dicyandiamide; ammonium sulphamate; alumina trihydrate; magnesium hydroxide alumina trihydrate; and the like, as well as derivatives, modifications, and combinations thereof. The amount of the flame retardant present in the sealant depends on various factors (e.g. the amount and/or type of the (I) copolymer, an intended use of the sealant, curing conditions to which the sealant is intended to be exposed, a presence/absence of a vehicle/solvent, etc.), and may be readily determined by one of skill in the art. In general, where present, the sealant comprises the flame retardant in an amount of from 0.01 to 15, alternatively from 0.1 to 10 wt. % based on the total weight of the sealant.

In certain embodiments, the sealant comprises a binder. Typically, the binder is a non-reactive, elastomeric, organic polymer, i.e., an elastomeric organic polymer that does not react with the (I) copolymer. Additionally, the binder is typically compatible with the (I) copolymer, i.e., the binder does not form a two-phase system when formulated into the sealant with the (I) copolymer. In general, suitable binders have low gas and moisture permeability, and typically comprise a number average molecular weight (Mn) of from 30,000 to 75,000. However, the binder may comprise a blend of various non-reactive, elastomeric, organic polymers (e.g. of such polymers having a high molecular weight with those having a low molecular weight). In such instances, the higher molecular weight polymer(s) typically comprise a Mn of from 100,000 to 600,000, and the lower molecular weight polymer(s) typically comprise a Mn of from 900 to 10,000, alternatively 900 to 3,000. The value for the lower end of the Mn ranges is typically selected such that the binder is compatible with the (I) copolymer and the other ingredients of the sealant, as understood by those of skill in the art. The binder may comprise or be one non-reactive, elastomeric, organic polymer or, alternatively may comprise two or more non-reactive, elastomeric, organic polymers that differ from one another, e.g. on a basis of structure, viscosity, average molecular weight (Mn or Mw), polymer units, sequence, etc., or combinations thereof.

Examples of suitable binders include polyisobutylenes, which are known in the art and are commercially available. Specific examples of polyisobutylenes include those marketed under the trademark OPPANOL® by BASF Corporation of Germany, as well as the various grades of hydrogenated polyisobutene marketed under the trademark PARLEAM® by NOF Corp. of Japan. Additional examples of suitable polyisobutylenes are commercially available from ExxonMobil Chemical Co. of Baytown, Tex., U.S.A. under the trademark VISTANEX®. These include VISTANEX® MML-80, MML-100, MML-120, and MML-140, which are paraffinic hydrocarbon polymers, composed of long, straight-chain macromolecules containing only chain-end olefinic bonds. VISTANEX® MM polyisobutylenes have a viscosity average molecular weight of from 70,000 to 90,000, and VISTANEX® LM polyisobutylenes (e.g. LM-MS) are lower-molecular weight polyisobutylenes having a viscosity average molecular weight of from 8,700 to 10. Additional examples of polyisobutylenes include VISTANEX LM-MH (viscosity average molecular weight of 10,000 to 11,700); Soltex PB-24 (Mn 950), Indopol® H-100 (Mn 910), Indopol® H-1200 (Mn 2100), from Amoco Corp. of Chicago, Ill., U.S.A.; NAPVIS® and HYVIS® (e.g. NAPVIS® 200, D10, and DE3; and HYVIS® 200.) from BP Chemicals of London, England. The NAPVIS® polyisobutylenes typically have a Mn of from 900 to 1300. In addition, or as an alternative, to the polyisobutylene(s), the binder may comprise or be a butyl rubber, a styrene-ethylene/butylene-styrene (SEBS) block copolymer, a styrene-ethylene/propylene-styrene (SEPS) block copolymer, polyolefin plastomer, or combinations thereof. SEBS and SEPS block copolymers are known in the art and are commercially available as Kraton® G polymers from Kraton Polymers U.S. LLC of Houston, Tex., U.S.A., and as Septon polymers from Kuraray America, Inc., New York, N.Y., U.S.A. Polyolefin plastomers are also known in the art and are commercially available as AFFINITY® GA 1900 and AFFINITY® GA 1950 compositions from Dow Chemical Company, Elastomers & Specialty Products Division, Midland, Mich., U.S.A.

The amount of the binder present in the sealant depends on various factors (e.g. the amount and/or type of the (I) copolymer, an intended use of the sealant, curing conditions to which the sealant is intended to be exposed, a presence/absence of a vehicle/solvent, etc.), and may be readily determined by one of skill in the art. In general, where present, the sealant comprises the binder in an amount of from 1 to 50, alternatively from 5 to 40, alternatively from 5 to 35 parts by weight, based on the combined weights of all components in the sealant.

In some embodiments, the sealant comprises an anti-aging additive. Examples of anti-aging additives include antioxidants, UV absorbers, UV and/or light stabilizers, heat stabilizers, and combinations thereof. The anti-aging additive may be or comprise but one anti-aging additive or, alternatively, may comprise two or more different anti-aging additives. Moreover, one particular anti-aging additive may serve multiple functions (e.g. as both a UV absorber and a UV stabilizer, as both an antioxidant and a UV absorber, etc.). Many suitable anti-aging additives are known in the art and are commercially available. For example, suitable antioxidants include phenolic antioxidants (e.g. fully-sterically hindered phenols and partially-hindered phenols) and combinations of phenolic antioxidants with stabilizers (e.g. sterically hindered amines, such as tetramethyl-piperidine derivatives, also known as "hindered amine light stabilizers" (HALS)). Suitable phenolic antioxidants include vitamin E and IRGANOX® 1010 from BASF. IRGANOX® 1010 comprises pentaerythritol tetrakis(3-(3,5-di-t-butyl-4-hydroxyphenyl)propionate). Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and combinations thereof (TINUVIN® 272). These and other TINUVIN® additives, such as TINUVIN® 765 are commercially available from BASF. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may also be utilized in or as the anti-aging additive, for example, to minimize potential for migration of the the anti-aging additive out of the sealant or a cured product thereof. Example of such oligomeric anti-oxidant stabilizers include TINUVIN® 622, which is a dimethylester of butanedioic acid copolymerized with 4-hydroxy-2,2,6,6-tetramethyl-1-piperidine ethanol. Examples of heat stabilizers include iron oxides, carbon blacks, iron carboxylate salts, cerium hydrates, barium zirconates, cerium and zirconium octoates, porphyrins, and the like, as well as combinations thereof.

The amount of the anti-aging additive present in the sealant depends on various factors (e.g. the amount and/or type of the (I) copolymer, an intended use of the sealant, curing conditions to which the sealant is intended to be exposed, etc.), and may be readily determined by one of skill in the art. In general, where present, the sealant comprises the anti-aging additive in an amount of from greater than 0 to 5, alternatively from 0.1 to 4, alternatively from 0.5 to 3 wt. %, based on the total weight of the sealant.

In certain embodiments, the sealant comprises a water release agent, i.e., a component that releases water over time (e.g. in response to an applied condition, such as a temperature and/or a pressure). Typically, the water release agent contains an amount of water sufficient to partially, alternatively fully, react the sealant, and is thus selected to release the amount of water when exposed to the applied condition (e.g. a use temperature of the sealant) for a sufficient amount of time. Generally, however the water release agent is selected to sufficiently bind the water to thereby prevent too much water from being released during making and/or storing the sealant. For example, the water release agent typically binds the water sufficiently during compounding/ formulating the sealant, such that sufficient water is available for condensation reaction of the (I) copolymer during or after the application process in which the sealant is used. This "controlled release" property also may provide the benefit of preventing too much water from being released and/or water being released too rapidly during the application process, since this may cause bubbling or voiding in the reaction product formed by condensation reaction of the (I) copolymer of the sealant. The particular water release agent selected can depend on various factors, (e.g. the other components of the sealant, the amount/type of the (I) copolymer, the type of the (II) condensation reaction catalyst, the process conditions under which the sealant will be formulated, etc.) and will be readily determined by one of skill in the art. Examples of suitable water release agents are exemplified by metal salt hydrates, hydrated molecular sieves, and precipitated carbonates. Particular examples include the precipitated calcium carbonate available from Solvay under the trademark WINNOFIL® SPM. In certain embodiments, the water release agent is selected to include, alternatively to be, precipitated calcium carbonate. The water release agent may be selected to ensure that not all of the water content is released during compounding, while still releasing a sufficient amount of water for condensation reaction of the (I) copolymer when exposed to the application temperature range for a sufficient period of time. The amount of the water release agent present in the sealant depends on various factors (e.g. the water permeability of the (I) copolymer, a presence/absence of vehicle/solvent, a presence/absence of drying agent, the method by which the sealant is to be formulated/prepared, etc.), and may be readily determined by one of skill in the art. In general, where present, the sealant comprises the water release agent in an amount of from 1 to 50, alternatively from 5 to 40, alternatively from 5 to 30 parts by weight, based on the combined weights of all components in the sealant.

In some embodiments, the sealant comprises a pigment (i.e., a component that imparts color to the sealant and/or a reaction product thereof). Such pigments may comprise any inorganic compounds, for example those of metals such as chromium oxides, titanium oxides, cobalt pigments, as well as those that are not based on such metals, e.g. non-metal inorganic compounds. Examples of suitable pigments include indigos, titanium dioxides, carbon blacks, and combinations thereof, as well as other commercially available pigments such as Stan-Tone 505P01 Green, which is available from PolyOne. In certain embodiments, the pigment comprises a carbon black. Specific examples of carbon blacks include Shawinigan Acetylene black, which is commercially available from Chevron Phillips Chemical Company LP; SUPERJET® Carbon Black (e.g. LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.). The amount of the pigment present in the sealant depends on various factors (e.g. the amount and/or type of the (I) copolymer, an intended use of the sealant, a presence/absence of a vehicle/solvent, etc.), and may be readily determined by one of skill in the art. In general, where present, the sealant comprises the pigment in an amount of from greater than 0 to 20, alternatively from 0.001 to 10, alternatively from 0.001 to 5 wt. % based on the total weight of the sealant.

In certain embodiments, the sealant comprises a rheology additive, such as a rheology modifier and/or a viscosity modifier. Examples of suitable rheological additives include waxes; polyamides; polyamide waxes; hydrogenated castor oil derivatives; metal soaps, such as calcium, aluminum, and/or barium stearates; and the like, as well as derivatives, modifications, and combinations thereof. In particular embodiments, the rheology modifier is selected to facilitate incorporation of fillers, compounding, de-airing, and/or mixing of the sealant (e.g. during preparation thereof), as well understood by those of skill in the art. Specific examples of rheological additives include those known in the art which are commercially available. Examples of such rheological additives include Polyvest, which is commercially available from Evonik; Disparlon which is commercially available from King Industries; Kevlar Fibre Pulp, which is commercially available from Du Pont; Rheospan which is commercially available from Nanocor; Ircogel, which is commercially available from Lubrizol; Crayvallac® SLX, which is commercially available from Palmer Holland, and the like, as well as combinations thereof.

In some embodiments, the rheology modifier comprises, alternatively is, a wax (e.g. a paraffin wax, a microcrystalline wax, or a combination thereof). The wax typically comprises non-polar hydrocarbon(s), which may comprise branched structures, cyclic structures, or combinations thereof. Examples of suitable waxes include petroleum microcrystalline waxes available from Strahl & Pitsch, Inc., of West Babylon, N.Y., U.S.A. under the names SP 96 (melting point of from 62 to 69° C.), SP 18 (melting point of from 73 to 80° C.), SP 19 (melting point of from 76 to 83° C.), SP 26 (melting point ranging from 76 to 83° C.), SP 60 (melting point of from 79 to 85° C.), SP 617 (melting point of from 88 to 93° C.), SP 89 (melting point of from 90 to 95° C.), and SP 624 (melting point of from 90 to 95° C.). Further examples of suitable waxes include those marketed under the trademark Multiwax® by Crompton Corporation of Petrolia, Pa., U.S.A. Such waxes include which include Multiwax® 180-W, which comprises saturated branched and cyclic non-polar hydrocarbons and has melting point of from 79 to 87° C.; Multiwax® W-445, which comprises saturated branched and cyclic non-polar hydrocarbons, and has melting point of from 76 to 83° C.; and Multiwax® W-835, which comprises saturated branched and cyclic non-polar hydrocarbons, and has melting point of from 73 to 80° C. In certain embodiments, the wax comprises, alternatively is, a microcrystalline wax that is a solid at room temperature (25° C.). In some embodiments, the wax is selected to have a melting point within a desired application temperature range (i.e., the temperature range within which the sealant is intended to be used/applied). It is thought that the wax, when molten, serves as a process aid, substantially easing the incorporation of filler in the composition during compounding, the compounding process itself, as well as in during a de-airing step, if used. For example, in certain embodiments, the wax has a melt temperature below 100° C. and may facilitate mixing of parts (e.g. when the sealant is a multiple part composition) before application, even in a simple static mixer. In such instances, the wax may also facilitate application of the sealant at temperatures of from 80 to 110° C., alternatively 90 to 100° C., with good rheology.

The amount of the rheological additive present in the sealant depends on various factors (e.g. the amount and/or type of the (I) copolymer, an intended use of the sealant, curing conditions to which the sealant is intended to be exposed, a presence/absence of a vehicle/solvent, etc.), and may be readily determined by one of skill in the art. In general, where present, the sealant comprises the rheological additive in an amount of from greater than 0 to 20, alternatively from 1 to 15, alternatively from 1 to 5, parts by weight, based on the combined weights of all components in the sealant.

In certain embodiments, the sealant comprises a vehicle (e.g. a carrier vehicle, such as a solvent and/or diluent). Depending on a selection of various components of the sealant, the carrier vehicle may be, for example, an oil (e.g. an organic oil and/or a silicone oil), a solvent, water, etc. As will be understood by one of skill in the art, the particular vehicle utilized, if any, is selected to facilitate (e.g. increase) flow of the sealant or a portion thereof (e.g. one or more parts of the sealant when the sealant is a multiple-part composition); as well as the introduction of certain components (e.g. the (I) copolymer, the chainextender, the endblocker, etc.). As such, suitable vehicles are varied, and generally include those which help fluidize one or more components of the sealant, but essentially do not react with any of such components. Accordingly, the vehicle may be selected based on a solubility of one or more components of the sealant, volatility, or both. In this sense, the solubility refers to the vehicle being sufficient to dissolve and/or disperse the one or more components of the sealant, and the volatility refers to vapor pressure of the vehicle. If the vehicle is too volatile (i.e., has a vapor pressure too high for the intended use), bubbles may form in the sealant at the application temperature, which may lead to cracks and/or otherwise weaken or detrimentally affect properties of the cured product formed from the sealant. However, if the vehicle is not volatile enough (i.e., has a vapor pressure too low for the intended use) the vehicle may remain in the cured product of the sealant and/or function as a plasticizer therein. Examples of suitable vehicles generally include silicone fluids, organic fluids, and combinations thereof.

In some embodiments, the vehicle of the sealant comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm$^2$/sec. In some embodiments, the silicone fluid comprises a silicone having the general formula $(R^{28}R^{29}SiO)_l$, where each $R^{28}$ and $R^{29}$ is independently selected from H and substituted or unsubstituted hydrocarbyl groups, and subscript l is from 3 to 8. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from 5×10$^{-7}$ to 1.5×10$^{-6}$ m$^2$/s, include DOWSIL;® 200 Fluids and DOWSIL® OS FLUIDS, which are commercially available from Dow Silicones Corporation of Midland, Mich., U.S.A.

In certain embodiments, the vehicle of the sealant comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogentated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the vehicle comprises, alternatively is, an organic solvent. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidinone; and the like, as well as derivatives, modifications, and combination thereof.

Other vehicles may also be utilized in the sealant. For example, in some embodiments, the vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl) imide, N-butyl-3-methylpyridinium bis(trifluoromethanesulfonyl)imide, 1-methyl-1-propylpyridinium bis(trifluoromethanesulfonyl)imide, diallyldimethylammonium bis (trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis(trifluoromethanesulfonyl)imide, 1-ethyl-3-methylimidazolium bis(trifluoromethanesulfonyl) imide, 1-vinylimidazolium.bis(trifluoromethanesulfonyl) imide, 1-allyl imidazolium bis(trifluoromethanesulfonyl) imide, 1-allyl-3-methylimidazolium bis (trifluoromethanesulfonyl)imide, lithium bis (trifluoromethanesulfonyl)imide, and the like, as well as derivatives, modifications, and combinations thereof.

The amount of the vehicle present in the sealant depends on various factors (e.g. the amount and/or type of the (I) copolymer, the manner by which the sealant was formulated, curing conditions to which the sealant is intended to be exposed, etc.), and may be readily determined by one of skill in the art. In general, where present, the sealant comprises the vehicle in an amount of from 1 to 99, alternatively from 1 to 75, alternatively from 2 to 60, alternatively from 2 to 50 wt. %, based on the total weight of the sealant.

In particular embodiments, the sealant comprises a tackifying agent. General examples of suitable tackifying agents typically include those comprising an aliphatic hydrocarbon resin (e.g. a hydrogenated polyolefin having 6 to 20 carbon atoms), a hydrogenated terpene resin, a rosin ester, a hydrogenated rosin glycerol ester, or a combination thereof. Specific examples of suitable tackifying agents include natural or modified rosins such as gum rosin, wood rosin, tall-oil rosin, distilled rosin, hydrogenated rosin, dimerized rosin, and polymerized rosin; glycerol and pentaerythritol esters of natural or modified rosins, such as glycerol esters of pale wood rosins, glycerol esters of hydrogenated rosins, glycerol esters of polymerized rosins, pentaerythritol esters of hydrogenated rosins, and phenolic-modified pentaerythritol esters of rosin; copolymers and/or terpolymers of natural terpenes, such as styrene/terpene and/or alpha methyl styrene/terpene polymers; polyterpene resins having a softening point, as determined by ASTM method E28, of from 60 to 150° C., such as those produced via the polymerization of terpene hydrocarbons (e.g. pinene) in the presence of Friedel-Crafts catalysts, as well as the hydrogenation products thereof (e.g. hydrogenated polyterpenes); phenolic modified terpene resins and hydrogenated derivatives thereof, such as those produced via acid-mediated condensation of a bicyclic terpene and a phenol; aliphatic petroleum hydrocarbon resins, such as those produced via the polymerization of monomers consisting of primarily of olefins and diolefins, those having a ring and ball softening point of from 60 to 135° C., and also hydrogenated aliphatic petroleum hydrocarbon resins; alicyclic petroleum hydrocarbon resins and hydrogenated derivatives thereof; aliphatic/aromatic or cycloaliphatic/aromatic copolymers and hydrogenated derivatives thereof; and combinations thereof. In some embodiments, the sealant comprises a solid tackifying agent (i.e., a tackifying agent having a ring and ball softening point above 25° C.). Other examples of suitable tackifying agents include commercially available varieties, such as the aliphatic hydrocarbon resins exemplified by ESCOREZ 1102, 1304, 1310, 1315, and 5600 from Exxon Chemical, and Eastotac H-100, H-115E, and H-130L from Eastman; the hydrogenated terpene resins exemplified by Arkon P 100 from Arakawa Chemicals, and Wingtack 95 from Goodyear; the hydrogenated rosin glycerol esters exemplified by Staybelite Ester 10 and Foral from Hercules; the polyterpenes exemplified by Piccolyte A125 from Hercules; the aliphatic/aromatic and/or cycloaliphatic/aromatic resins exemplified by ECR 149B and ECR 179A from Exxon Chemical; and combinations thereof. The amount of the tackifying agent present in the sealant depends on various factors (e.g. the amount and/or type of the (I) copolymer, the type and/or amount of other components of the sealant, an intended use of the sealant, etc.), and may be readily determined by one of skill in the art. In general, where present, the sealant comprises the tackifying agent in an amount of from 1 to 20 parts by weight, based on the combined weights of all components in the sealant.

In certain embodiments, the sealant comprises a corrosion inhibitor. Examples of suitable corrosion inhibitors include benzotriazoles, mercaptabenzotriazoles, and the like, as well as combinations thereof. Specific examples of suitable corrosion inhibitors are known in the art and commercially available, such as CUVAN® 826 (e.g. a 2,5-dimercapto-1, 3,4-thiadiazole derivative) and CUVAN® 484 (an alkylthiadiazole), which are available from R. T. Vanderbilt of Norwalk, Conn., U.S.A.

The amount of the corrosion inhibitor present in the sealant depends on various factors (e.g. the amount and/or type of the (I) copolymer, an intended use of the sealant, curing conditions to which the sealant is intended to be exposed, etc.), and may be readily determined by one of skill in the art. In general, where present, the sealant comprises the corrosion inhibitor in an amount of from 0.05 to 0.5 wt. % based on total weight of the sealant.

As introduced in various sections above, various components of the sealant may be utilized for multiple purposes, and thus certain additives may overlap with regard to the components described herein. For example, certain alkoxysilanes may be useful as filler treating agents, as adhesion promoters, and as crosslinkers. Additionally, the sealant may further comprise additional additives not described above, such as catalyst inhibitors, curing promotors, color-change additives, etc. Such additional additives are independently selected, and each utilized in the sealant in an amount selected based on the indented use thereof, as readily determined by one of skill in the art. Typically, where present, the sealant comprises each of such additional additives in an amount of from 0.001 to 10, alternatively from 0.01 to 5, alternatively from 0.1 to 1 wt. % based on total weight of the sealant.

As described above, the sealant may be prepared as a one-part composition, or as a multiple-part composition (e.g. comprising 2, 3, 4, or more parts). For example, in some embodiments, the sealant is prepared as the one-part composition, which may be prepared by combining all components together by any convenient means, such as mixing. Such a one-part composition may be made by optionally combining (e.g. premixing) the (I) copolymer with various additives (e.g. the filler) to form an intermediate mixture, and subsequently combining (e.g. via mixing) the intermediate mixture with a pre-mix comprising the (II) condensation reaction catalyst and other various additives to form a sealant mixture or the sealant. Other additives (e.g. the anti-aging additive, the pigment, etc.) may be added to the sealant at any desired stage, such as via combination with the intermediate mixture, the pre-mix, or the sealant mixture. As such, a final mixing step may be performed (e.g. under substantially anhydrous conditions) to form the sealant, which is typically stored under substantially anhydrous conditions, for example in sealed containers, until ready for use.

In some embodiments, the sealant is prepared as the multiple-part composition (e.g. when the crosslinker is utilized). In such embodiments, the (II) condensation reaction catalyst and the crosslinker are typically stored in separate parts, which are combined shortly before use of the sealant. For example, the sealant may comprise a two part curable composition prepared by combining the (I) copolymer and the crosslinker to form a first (i.e., curing agent) part by any convenient means (e.g. mixing). A second (i.e., base) part may be prepared by combining the (II) condensation reaction catalyst and (I) copolymer by any convenient means (e.g. mixing). The components may be combined at ambient or elevated temperature and under ambient or anhydrous conditions, depending on various factors, e.g. whether a one part or multiple part composition is selected. The base part and curing agent part may then be combined by any convenient means, such as mixing, shortly before use. The base part and curing agent part may be combined in a 1:1 ratio, or in a relative amount of base: curing agent ranging from 1:1 to 10:1.

The equipment used for mixing the components of the sealant is not specifically restricted, and is typically selected depending on the type and amount of each component selected for use in the sealant or a part thereof (collectively, the "sealant compositions".) For example, agitated batch kettles may be used for relatively low viscosity sealant compositions, such as compositions that would react to form gums or gels. Alternatively, continuous compounding equipment (e.g. extruders, such as twin screw extruders) may be used for more viscous sealant compositions, as well as sealant compositions containing relatively high amounts of particulates. Exemplary methods that can be used to prepare the sealant compositions described herein include those disclosed in, for example, U.S. Patent Publication Nos. 2009/0291238 and 2008/0300358, which portions are herein incorporated by reference.

The sealant compositions made as described above may be stable when stored in containers that reduce or prevent exposure of the sealant compositions to moisture. However, the sealant compositions, may react via condensation reaction when exposed to atmospheric moisture. Additionally, when the water release agent is utilized, the sealant compositions may react via condensation reaction without exposure to atmospheric moisture.

A cured product is also provided. The cured product is formed from the sealant. More specifically, the cured product is formed by curing the sealant, e.g. via the condensation reaction described above.

A composite article comprising the cured product is also provided. More specifically, the composite article comprises a substrate and the cured product disposed on the substrate. The composite article is formed by disposing the sealant on the substrate, and curing the sealant to give the cured product on the substrate, thereby preparing the composite article. The substrate is exemplified by, for example, an exterior building façade.

A method of sealing a space defined between two elements is also disclosed. This method comprises applying the sealant to the space, and curing the sealant in the space, thereby sealing the space.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention. Table 1 below sets forth abbreviations as utilized in the Examples.

TABLE 1

Abbreviations

| Abbreviation | Meaning/Definition |
| --- | --- |
| 3-7010 | 1,1,3,3-Tetramethyldisiloxane |
| 0-0719 | Complex of Pt with 1,3-diethenyl-1,1,3,3-tetramethyldisiloxane |
| M'DM' | 1,1,2,2,3,3-Hexamethyltrisiloxane |
| ATMS | Allyl trimethoxysilane |
| MM | Hexamethyldisiloxane |
| 1-8114 | SiH terminated PDMS (DP ca 6.5) |
| Q2-5057S | SiH terminated PDMS (DP ca 16.5) |
| Polyether Compound 1 | Polypropylene glycol dimethallyl capped (Mw ca 1300) |
| Polyether Compound 2 | Polypropylene glycol dimethallyl capped (Mw ca 4000) |
| Polyether Compound 3 | Polypropylene glycol dimethallyl capped (Mw ca 8000) |
| ETM linear | Trimethoxysilylethyl tetramethyldisiloxane (>95% β-form) |
| EHM | Bis(trimethoxysilyl)ethyl)-dimethylsiloxy-n-propylsilane |
| FTIR | Fourier Transform Infra-Red |
| NMR | Nuclear Magnetic Resonance |
| ml | Milliliters |
| ° C. | Degrees Celsius |
| mg | Milligrams |
| Mn | Number average molecular weight determined by NMR |
| NMR | Nuclear magnetic resonance |
| N/A | Not available (not measured) |

Preparation Example 1

A dry 4 neck flask is placed into a temperature controlled heating block and fitted with mechanical stirrer, thermometer, dropping funnel, and reflux condenser. The flask is purged with $N_2$, and the polyether compound is disposed therein. The flask is heated and kept at 105° C. for 2 hours under vacuum with intermittent $N_2$ purging. The flask is then cooled to 85° C. A hydrosilylation catalyst is added (5 ppm, 1 wt. % solution of 0-0719 dissolved in MM). A chain extending organosilicon compound is added drop-wise. An adiabatic exotherm is observed with a ca 5-10° C. increase in temperature and the reaction temperature is kept at ca 95° C. by adjusting the addition of the chain extending organosilicon compound accordingly. The reaction temperature is held at ca 95° C. for a time (T1) until the reaction is deemed complete, i.e., until no SiH is detectable by $^1$H NMR or FTIR. The endcapping organosilicon compound is added drop-wise. An adiabatic exotherm is observed with ca 5° C. increase in temperature. The reaction is then heated to and held at ca 95° C. for a time (T2) until complete, with additional endcapping organosilicon compound being added in case of excess C=C observed by $^1$H NMR. The reaction is deemed completed when C=C is either gone or less than 2% of starting amount (by $^1$H NMR). In case of all C=C being consumed but residual SiH still being present (by $^1$H NMR or FTIR), ATMS is added in excess to scavenge the residual SiH. Once complete, the reaction mixture is heated and kept at 105° C. for 2 hours under vacuum to remove all volatiles. The contents of the flask are then cooled to room temperature and packaged to a Nalgene-container under $N_2$ flow. The finished material is referred to as the silicone-polyether copolymer.

Examples 1 to 4

Silicone-polyether copolymers are prepared according to the procedure set forth in Preparation Example 1. Table 2 below sets forth the relative amounts of the polyether compound, the chain extending organosilicon compound (CEOC), and the endcapping organosilicon compound (EOC).

In the structures given for the silicone-polyether copolymers of the examples in Table 2 below, Y represents a polyether moiety formed from the polyether compound; Z represents a siloxane moiety formed from the chain extending organosilicon compound; X represents a silicone moiety formed from the endcapping organosilicon compound; and c is the approximate number of terminal functional groups X of the silicone-polyether copolymer.

TABLE 2

Raw materials for silicone-polyether copolymers

| Example $[(YZ)_c - Y] - X_2$ | Polyether compound | CEOC | Time (T1) | EOC | Time (T2) |
| --- | --- | --- | --- | --- | --- |
| Example 1<br>Y = Polyether compound 3<br>Z = M'DM'<br>X = ETM linear c~1 | 36.1 g<br>Polyether compound 3 | 0.6 g<br>M'DM' | 12 hours | 1.3 g<br>ETM linear | 12 hours |
| Example 2<br>Y = Polyether compound 3<br>Z = 1-8114<br>X = ETM linear c~1 | 195.8 g<br>Polyether compound 3 | 7.9 g<br>1-8114 | 12 hours | 8.6 g<br>ETM linear | 12 hours |
| Example 3<br>Y = Polyether compound 3<br>Z = Q2-5057S<br>X = ETM linear c~1 | 187.8 g<br>Polyether compound 3 | 20.4 g<br>Q2-5057S | 12 hours | 8.4 g<br>ETM linear | 12 hours |
| Example 4<br>Y = Polyether compound 3<br>Z = Q2-5057S<br>X = EHM c~1 | 174.3 g<br>Polyether compound 3 | 18.8 g<br>Q2-5057S | 12 hours | 17.8 g<br>EHM | 12 hours |

Preparation Example 2: Two-Step Synthetic Procedure for Preparing Silicone Polyether Copolymers A dry 4 neck flask is placed into a temperature controlled heating block and fitted with mechanical stirrer, thermometer, dropping funnel, and reflux condenser. The flask is purged with $N_2$, and the polyether compound is disposed therein. The flask is heated and kept at 105° C. for 2 hours under vacuum with intermittent $N_2$ purging. The flask is then cooled to 85° C. An endcapping organosilicon compound is loaded into the reaction flask. A hydrosilylation catalyst is added (5 ppm, 1 wt. % solution of 0-0719 dissolved in MM). An adiabatic exotherm is observed with ca 5-10° C. increase in temperature. The reaction temperature is held at ca 95° C. for a time (T1) until the reaction is deemed complete, i.e., until no SiH is detectable by $^1$H NMR or FTIR. A chain extending organosilicon compound is added drop-wise. An adiabatic exotherm is observed with ca 5-10° C. increase in temperature and the reaction temperature is held at ca 95° C. by adjusting the addition of the chain extending organosilicon compound accordingly. The reaction is then heated to and held at ca 95° C. for a time (T2) until complete, with additional endcapping organosilicon compound being added in case of excess C=C observed by $^1$H NMR. The reaction is deemed completed when C=C is either gone or less than 2% of starting amount (by $^1$H NMR). In case of all C=C being consumed but residual SiH still being present (by $^1$H NMR or FTIR), ATMS is added in excess to scavenge the residual SiH. Once complete, the reaction mixture is heated and kept at 105° C. for 2 hours under vacuum to remove all volatiles. The contents of the flask are then cooled to room temperature and packaged to a Nalgene-container under N$_2$ flow. The finished material is referred to as the silicone-polyether copolymer.

Examples 5 to 7

Silicone-polyether copolymers are prepared according to the procedure set forth in Preparation Example 2. Table 3 below sets forth the relative amounts of the polyether compound, the chain extending organosilicon compound (CEOC), and the endcapping organosilicon compound (EOC).

In the structures given for the silicone-polyether copolymers of the examples in Table 3 below, Y represents a polyether moiety formed from the polyether compound; Z represents a siloxane moiety formed from the chain extending organosilicon compound; X represents a silicone moiety formed from the endcapping organosilicon compound; and c is the approximate number of terminal functional groups X of the silicone-polyether copolymer.

TABLE 3

Materials for silicone-polyether copolymers

| Example [(YZ)$_c$ – Y] – X$_2$ | Polyether compound | EOC | Time (T1) | CEOC | Time (T2) |
|---|---|---|---|---|---|
| Example 5<br>Z = M'DM'<br>Y = Polyether compound 3<br>X = ETM linear<br>c~1 | 32.8 g Polyether compound 3 | 1.1 g ETM linear | 1 hour | 0.5 g M'DM' | 10 hours |
| Example 6<br>Z = M'DM'<br>Y = Polyether compound 2<br>X = ETM linear<br>c ~ 3 | 32.8 g Polyether compound 2 | 1.1 g ETM linear | 1 hour | 1.0 g M'DM' | 10 hours |
| Example 7<br>Z = M'DM'<br>Y = Polyether compound 2<br>X = ETM linear<br>c ~ 3 | 32.4 g Polyether compound 2 | 1.1 g ETM linear | 1 hour | 1.2 g M'DM' | 10 hours |

Preparation Example 3: One-Step Procedure for Preparing Silicone-Polyether Copolymers A dry 4 neck flask is placed into a temperature controlled heating block and fitted with mechanical stirrer, thermometer, dropping funnel, and reflux condenser. The flask is purged with N$_2$, and the polyether compound is disposed therein. The flask is heated and kept at 105° C. for 2 hours under vacuum with intermittent N$_2$ purging. The flask is then cooled to 85° C. A chain extending organosilicon compound and an endcapping organosilicon compound are then loaded into the flask. A hydrosilylation catalyst is added (5 ppm, 1 wt. % solution of 0-0719 dissolved in MM), and an adiabatic exotherm is observed with a ca 5-10° C. increase in temperature. The reaction is then heated to and held at ca 95° C. for a time (T1) until the reaction is complete, i.e., when C=C is either gone or less than 2% of starting amount by $^1$H NMR. Additional endcapping organosilicon compound is added in case of residual C=C. In case of all C=C being consumed but residual SiH still being present (by $^1$H NMR or FTIR), ATMS is added in excess to scavenge the residual SiH. Once complete, the reaction mixture is heated and kept at 105° C. for 2 hours under vacuum to remove all volatiles. The contents of the flask are then cooled to room temperature and packaged to a Nalgene-container under N$_2$ flow. The finished material is referred to as the silicone-polyether copolymer.

Example 8

A silicone-polyether copolymer is prepared according to the procedure set forth in Preparation Example 3. Table 4 below sets forth the relative amounts of the polyether compound, the chain extending organosilicon compound (CEOC), and the endcapping organosilicon compound (EOC) used in this example.

In the structure given for the silicone-polyether copolymer of Example 10 in Table 4 below, Y represents a polyether moiety formed from the polyether compound; Z represents a siloxane moiety formed from the chain extending organosilicon compound; X represents a silicone moiety formed from the endcapping organosilicon compound; and c is the approximate number of terminal functional groups X of the silicone-polyether copolymer.

TABLE 4

Materials for silicone-polyether copolymer

| Example [(YZ)$_n$ – Y] – X$_2$ | Polyether compound | CEOC | EOC | Time (T1) |
|---|---|---|---|---|
| Example 8<br>Y = Polyether compound 3<br>Z = M'DM'<br>X = ETM linear<br>c~1 | 304.0 g Polyether compound 3 | 5.3 g 'MDM' | 10.5 g ETM linear | 12 hours |

The viscosity, molecular number (GPC), and molecular weight (GPC), and polydispersity (PD) of the silicone-polyether copolymers of Examples 1-8 are taken and calculated, and set forth in Table 5 below.

TABLE 5

Viscosity and GPC Evaluation of Examples 1-8

| Example Copolymer (Z – Y)$_c$ – X$_2$ | Viscosity [mPa · sec] Shear Rate 2 sec$^{-1}$, 25° C. | Mn (GPC) | Mw (GPC) | PD |
|---|---|---|---|---|
| 1 | 5.84E+4 | 22700 | 47300 | 2.1 |
| 2 | 1.88E+4 | 19600 | 32600 | 1.7 |
| 3 | 1.15E+4 | 15600 | 26900 | 1.7 |
| 4 | 9.11E+3 | 16900 | 26200 | 1.6 |
| 5 | 6.52E+4 | 20500 | 67900 | 3.3 |
| 6 | 2.88E+3 | 9150 | 17200 | 1.9 |
| 7 | 3.37E+3 | 8760 | 19500 | 2.2 |
| 8 | 5.8E+4 | 25500 | 48900 | 1.9 |

Practical Examples 1-8: Curing and Testing Procedures for the Silicone-Polyether Copolymers of Examples 1-8

A 30 g sample of each of the silicone-polyether copolymers of Examples 1-8 is mixed with 0.03 g of dibutyl tin dilaurate in a 40 g capacity polypropylene mixing cup for a Flacktek speedmixer, and mixed at 2000 rpm for 1 minute. The mixture is cast onto a Teflon plate 10 cm by 10 cm in size and with edge guard. The Teflon plate is placed in a room with relatively humidity controlled at 50%, and temperature controlled to be 23° C. The plate is left in the room to cure for 7 days, then moved into an air circulating oven set at 50° C. with atmospheric moisture content not regulated, and kept in the oven for 4 days. At the end, the sample is taken out of the oven, cooled to room temperature. Dogbone specimens are cut from the sample with a carbon steel die for tensile test, and small pieces are cut from the sample for differential scanning calorimetry (DSC).

The dogbone sample size for the tensile test is 50 mm long with a narrow neck length of 20 mm. A MTS testing frame with a load cell of 100 N full capacity is used for the test. The testing speed is 50.8 cm/min. The strain is calculated as the displaced over the length of the narrow neck. Stress at break is calculated by dividing the peak stress with the initial cross-sectional area of the narrow neck region.

Differential Scanning calorimetry (DSC) is done with a TA Instrument Discovery Series DSC2500. The sample is weighed into Tzero aluminum pans (~10 mg of sample) and analyzed on the instrument, the temperature is first ramped down to −180° C. at 10° C./min and then up to 200° C. at 10° C./min. The heat needed to keep up with the ramping process is recorded and the Tg is detected as an abrupt change in heat capacity. Properties measured from these silicone-polyether copolymers are included in Table 6.

TABLE 6

Tensile properties and Tg of cured silicone-polyether copolymers

| Ex. # | Sample | Stress at 25% Strain (psi) | Stress at 100% Strain (psi) | Strain at Peak (%) | Break Stress (psi) | Tg from DSC (° C.) |
|---|---|---|---|---|---|---|
| P.E. 1 | Ex. 1 | 4.2 ± 1.4 | 4.7 ± 1.5 | 501.9 ± 3.3 | 38.7 ± 0.1 | −68.13 |
| P.E. 2 | Ex. 2 | 32.9 ± 1.7 | 84.1 ± 2.5 | 103.6 ± 4.0 | 87.9 ± 3.0 | N/A |
| P.E. 3 | Ex. 3 | 18.8 ± 1.1 | 51.3 ± 0.9 | 158.9 ± 28.9 | 72.6 ± 8.6 | N/A |
| P.E. 4 | Ex. 4 | 38.4 ± 0.6 | N/A | 82.3 ± 3.9 | 90.7 ± 2.9 | N/A |
| P.E. 5 | Ex. 5 | 8.2 ± 4.3 | 23.4 ± 2.2 | 174.9 ± 27.6 | 36.7 ± 5.6 | −67.65 |
| P.E. 6 | Ex. 6 | 12.9 ± 0.9 | N/A | 77.6 ± 8.8 | 33.6 ± 5.6 | −67.85 |
| P.E. 7 | Ex. 7 | 2.5 ± 1.3 | 11.9 ± 0.3 | 160.8 ± 16.8 | 20.6 ± 2.4 | −68.71 |
| P.E. 8 | Ex. 8 | 16.8 ± 0.7 | 42.9 ± 3.8 | 268.5 ± 29.0 | 87.8 ± 9.3 | −65.3 |

Preparation Example 4: Sealant Preparation Procedure

A pre-mix solution of aminoethylaminopropyltrimethoxysilane (as an adhesion promoter) and dibutyltindilaurate (as a catalyst) are combined into a one ounce glass vial. This solution is then mixed by hand until a transparent straw color is obtained, and the mixture is set aside for use later in the formulation process.

A max 300 long mixing jar designed for use with the DAC 600.2 VAC SpeedMixer was placed on a balance and tared. A silicone-polyether copolymer, diisononyl phthalate (as a plasticizer), and vinyltrimethoxysilane (as a drying agent) are disposed in the jar. The contents of the jar are mixed for 30 seconds at 800 rpm. Precipitated calcium carbonate (UltraPflex from Specialty Minerals, Inc) is added to the jar and the jar is placed into the mixer and mixed for 30 seconds at 1300 rpm. The jar is removed from the mixer and scraped by hand with a spatula to incorporate any remaining calcium carbonate on the walls of the jar, and placed back into the mixer for another mixing cycle of 30 seconds at 1500 rpm. The jar is placed on the balance and ground calcium carbonate (CS-11 from Solvay Carbonates) is disposed therein. This jar is put back into the mixer for 30 seconds at 1300 rpm, removed for hand scraping, and then mixed for an additional 30 seconds at 2000 rpm. The mixture formed above is weighed into the jar and mixed for 30 seconds at 1300 rpm and then hand scraped. A final step to de-air the material is performed. The solid mixing jar lid is replaced with one containing a hole to allow air to escape the mixing jar when in the mixing/vacuum chamber. A program is run with continual mixing according to the following set points: 37 seconds of mixing at 800 rpm to 3.5 psi vacuum pressure, 40 seconds of mixing at 1200 rpm holding 3.5 psi of vacuum, and 35 seconds of mixing at 800 rpm to break vacuum to ambient conditions. The resultant sealant is packaged into a six ounce SEMCO tube and set aside for testing at a later date.

Table 7 below sets forth the components and their relative amounts utilized in the sealant preparation procedure of Preparation Example 4.

TABLE 7

Sealant formulations

| Component | Weight (%) |
|---|---|
| Polymer | 32.89 |
| Plasticizer | 8.09 |
| Precipitated Calcium Carbonate | 39.47 |
| Ground Calcium Carbonate | 17.73 |
| Drying Agent | 1.22 |
| Condensation Catalyst | 0.1 |
| Adhesion Promoter | 0.5 |

Practical Example 9

A sealant is prepared in accordance with the sealant preparation procedure of Example 12 using the silicone-polyether copolymer of Example 3.

Practical Example 10

A sealant is prepared in accordance with the sealant preparation procedure of Example 12 using the silicone-polyether copolymer of Example 4.

Practical Example 11

A sealant is prepared in accordance with the sealant preparation procedure of Example 12 using the silicone-polyether copolymer of Example 5.

Example 13: Sealant Properties

The physical and curing properties of Practical Examples 9-11 were evaluated in accordance with the following respective procedures:

Tack Free Time: A 100 mil thick slab of the particular sealant is drawn down on a piece of polyethylene terephthalate (PET). A small strip of PET is then lightly pressed onto the surface of the particular sealant to check for cure. When no sealant is transferred to the strip of PET, the sealant is considered tack free.

Extrusion Rate: A SEMCO Nozzle Type 440 is affixed to a 6-oz SEMCO tube. A brief extrusion is performed to fill the extrusion nozzle. Three data points of three seconds time are each collected with an extrusion force of 90 psi. The extrusion rate is then calculated in grams per minute as an average of the three data points.

The particular sealant is cured at 50% relative humidity and 23° C. for seven days. Durometer is measured by ASTM Method D2240, Type A. Tensile, Elongation, and Modulus are measured by ASTM Method D412. Table 8 below sets forth the physical properties from Practical Examples 9-11.

TABLE 8

| | | Polymer Type | | |
|---|---|---|---|---|
| | Units | P.E. 9 DP6.5 chain extension with ETM Linear | P.E. 10 DP16 chain extension with ETM Linear | P.E. 11 DP16 chain extension with EHM |
| Extrusion Rate | g/min | 116 | 122 | 96 |
| Slump | inches | 0.05 | 0 | 0.05 |
| SOT | minutes | 15 | 60 | 13 |
| TFT | minutes | 30 | 100 | 26 |
| Durometer | Shore A | 56 | 48 | 59 |
| Tensile | psi | 236 | 180 | 230 |
| Elongation | % | 253 | 255 | 159 |
| 25% Modulus | psi | 113 | 73 | 132 |
| 100% Modulus | psi | 200 | 149 | 217 |

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A silicone-polyether copolymer having the formula $X_g[Z_jY_o]_c$, wherein each X is independently a silicone moiety having one of formulas (I) or (II):

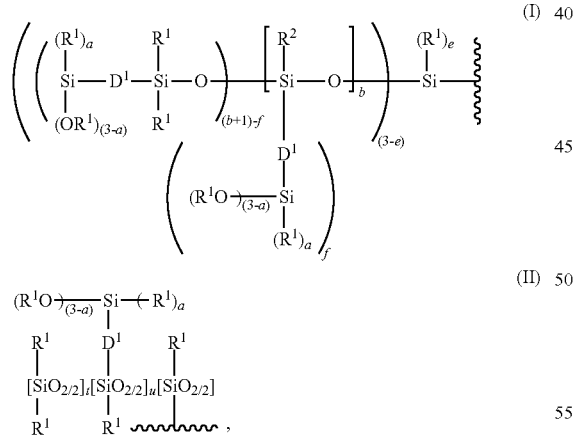

each Y is an independently selected polyether moiety, and each Z is an independently selected siloxane moiety having the formula $[R^1{}_hSiO_{(4-h)/2}]_d$, where each $R^1$ is an independently selected substituted or unsubstituted hydrocarbyl group having from 1 to 18 carbon atoms; each $R^2$ is an independently selected substituted or unsubstituted hydrocarbyl group having from 1 to 18 carbon atoms; each $D^1$ is an independently selected divalent hydrocarbon group having from 2 to 18 carbon atoms; each subscript a is independently 0 or 1; each subscript b is independently 0 or 1; subscript c is from 1 to 150; each subscript d is from 1 to 1000; each subscript e is independently 1 or 2; each subscript f is independently 0 or 1, with the provisos that within each X, when f is 1, b is 1, and when b is 1, f is 1; subscript g is >1; subscript h is independently selected from 0 to 2 in each moiety indicated by subscript d; each subscript j is independently >0 and <2; each subscript o is independently >0 and <2, with the proviso that j+o=2 in each moiety indicated by subscript c; subscript t is ≥0; and subscript u is >0.

2. The silicone-polyether copolymer of claim 1, wherein the silicone-polyether copolymer has the formula:

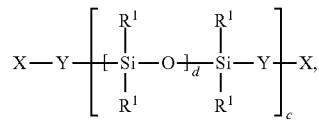

wherein each X, Y, $R^1$, subscript c, and subscript d is defined above.

3. The silicone-polyether copolymer of claim 1, wherein:
(i) each polyether moiety Y comprises a polyether group having the formula $$—O—(C_nH_{2n}O)_w—,$$

wherein subscript n is independently selected from 2 to 4 in each moiety indicated by subscript w, and subscript w is from 1 to 1000;
(ii) each polyether moiety Y has a number average molecular weight of at least about 100;
(iii) at least one polyether moiety Y is a polyhydroxyl polyether; or
(vi) a combination of (i)-(iii).

4. The silicone-polyether copolymer of claim 1, wherein each polyether moiety Y has the formula:

—CH$_2$—CH(R$^3$)-[D$^2$]$_m$-O—[C$_2$H$_4$O]$_x$[C$_3$H$_6$O]$_y$ [C$_4$H$_8$O]$_z$-[D$^2$]$_m$-CH(R$^3$)—CH$_2$—, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, subscript m is 0 or 1, subscript x is from 0 to 999, subscript y is from 1 to 1000, and subscript z is from 0 to 999, and wherein units indicated by subscripts x, y and z may be in randomized or block form in the polyether moiety Y.

5. The silicone-polyether copolymer of claim 1, wherein:
(i) each $R^1$ is methyl;
(ii) each $R^2$ is propyl;
(iii) each subscript a is 0;
(iv) each $D^1$ is $C_2H_4$; or
(v) any combination of (i) to (iv).

6. A method of preparing a silicone-polyether copolymer, said method comprising:
reacting a polyether compound having on average more than one terminal unsaturated group, a chain extending organosilicon compound, and an endcapping organosilicon compound in the presence of a hydrosilylation catalyst to give the silicone-polyether copolymer;
wherein the silicone-polyether copolymer is according to claim 1.

7. The method of claim 6, wherein
the polyether compound has the formula:

$$Y^1[R^4]_i,$$

wherein each $R^4$ is an independently selected unsaturated group having from 2 to 14 carbon atoms; subscript i is >1; and
$Y^1$ is an independently selected polyether moiety comprising a polyether group having the formula $$-O-(C_nH_{2n}O)_w-,$$

wherein subscript n is independently selected from 2 to 4 in each moiety indicated by subscript w, and subscript w is from 1 to 1000.

8. The method of claim 7, wherein in the polyether compound:
(i) the polyether moiety $Y^1$ has the formula:

$$-O-[C_2H_4O]_x[C_3H_6O]_y[C_4H_8O]_z-,$$

wherein each subscript x is independently from 0 to 999, each subscript y is independently from 1 to 1000, and each subscript z is independently from 0 to 999, and
wherein units indicated by subscripts x, y and z may be in randomized or block form in the polyether moiety $Y^1$;
(ii) each $R^4$ has the formula:

$$CH_2=C(R^3)-[D^2]_m-,$$

wherein each $R^3$ is independently a hydrocarbyl group having from 1 to 6 carbon atoms, an alkoxy group, a silyl group, or H; each $D^2$ is an independently selected divalent group having from 1 to 6 carbon atoms, and subscript m is 0 or 1; or
(iii) both (i) and (ii).

9. The method of claim 8, wherein in each $R^4$ of formula $$CH_2=C(R^3)-[D^2]_m-:$$

(i) each $R^3$ is methyl;
(ii) each subscript m is 1 and each $D^2$ is $CH_2$; or
(iii) both (i) and (ii).

10. The method of claim 6, wherein the chain extending organosilicon compound comprises:
(i) a linear silicon hydride functional organosilicon compound;
(ii) a branched silicon hydride functional organosilicon compound; or
(iii) both (i) and (ii).

11. The method of claim 10, wherein the chain extending organosilicon compound comprises the linear silicon hydride functional organosilicon compound, and wherein the linear silicon hydride functional organosilicon compound has the formula:

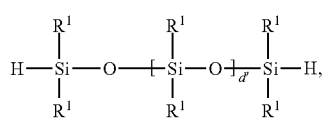

wherein each $R^1$ is an independently selected substituted or unsubstituted hydrocarbyl group having from 1 to 18 carbon atoms; and each subscript d' is from 1 to 999.

12. The method of claim 6, wherein the endcapping organosilicon compound has formula (III) or (IV):

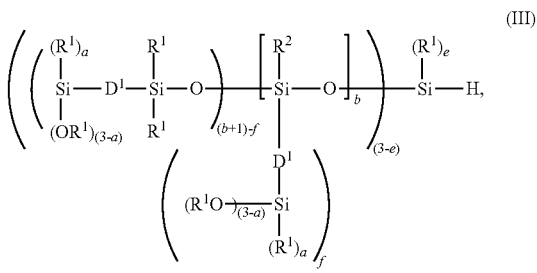

(III)

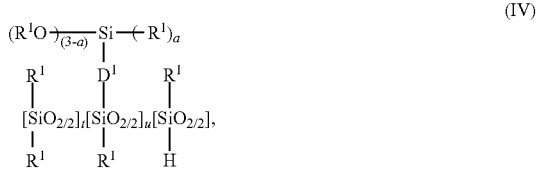

(IV)

wherein each $R^1$, $R^2$, $D^1$, subscript a, subscript b, subscript e, subscript f, subscript t, and subscript u are as defined above.

13. The method of claim 6, comprising:
(i) reacting the polyether compound and the chain extending organosilicon compound in the presence of the hydrosilylation catalyst to give a chain-extended silicone-polyether compound, and reacting the chain-extended silicone-polyether compound and the endcapping organosilicon compound in the presence of a hydrosilylation catalyst to give the silicone-polyether copolymer;
(ii) reacting the polyether compound and the endcapping organosilicon compound in the presence of the hydrosilylation catalyst to give an endcapped silicone-polyether compound, and reacting the endcapped silicone-polyether compound and the chain extending organosilicon compound in the presence of a hydrosilylation catalyst to give the silicone-polyether copolymer; or
(iii) both (i) and (ii).

14. The method of claim 13, comprising (i) reacting the polyether compound and the chain extending organosilicon compound in the presence of the hydrosilylation catalyst to give the chain-extended silicone-polyether compound, wherein the chain-extended silicone-polyether compound has the formula:

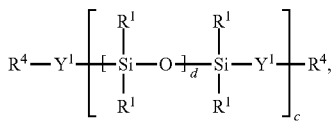

where each $R^4$ is an independently selected unsaturated group having from 2 to 14 carbon atoms;
subscript c is from 1 to 150; each subscript d is from 1 to 1000; and each $Y^1$ is an independently selected polyether moiety comprising a polyether group having the formula $-O-(C_nH_{2n}O)_w-$, wherein subscript n is independently selected from 2 to 4 in each moiety indicated by subscript w, and subscript w is from 1 to 1000.

15. The method of claim 14, wherein in the chain-extended silicone-polyether compound:
(i) each polyether moiety $Y^1$ has the formula:

$$-O-[C_2H_4O]_x[C_3H_6O]_y[C_4H_8O]_z-,$$

wherein each subscript x is independently from 0 to 999, each subscript y is independently from 1 to 1000, and each subscript z is independently from 0 to 999, and wherein units indicated by subscripts x, y and z may be in randomized or block form in the polyether moiety $Y^1$;

(ii) each $R^4$ has the formula:

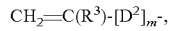

$CH_2$=$C(R^3)$-$[D^2]_m$-, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, and subscript m is 0 or 1; or (iii) both (i) and (ii).

16. A silicone-polyether copolymer prepared in accordance with the method of claim 6.

17. A sealant, comprising:
a silicone-polyether copolymer; and
a condensation reaction catalyst;
wherein the silicone-polyether copolymer is according to claim 1.

18. A cured product of the sealant of claim 17.

19. A composite article comprising a substrate and the cured product of claim 18 disposed on the substrate.

* * * * *